United States Patent
Haas et al.

(10) Patent No.: US 12,489,526 B2
(45) Date of Patent: Dec. 2, 2025

(54) OPTICAL WIRELESS COMMUNICATION APPARATUS AND METHOD

(71) Applicant: pureLiFi Limited, Edinburgh (GB)

(72) Inventors: Harald Ulrich Haas, Edinburgh (GB); Rui Bian, Edinburgh (GB); Ardimas Andi Purwita, Edinburgh (GB)

(73) Assignee: PURELIFI LIMITED, Edinburgh (GB)

( * ) Notice: Subject to any disclaimer, the term of this patent is extended or adjusted under 35 U.S.C. 154(b) by 273 days.

(21) Appl. No.: 17/928,269

(22) PCT Filed: Jun. 1, 2021

(86) PCT No.: PCT/EP2021/064706
§ 371 (c)(1),
(2) Date: Nov. 28, 2022

(87) PCT Pub. No.: WO2021/245097
PCT Pub. Date: Dec. 9, 2021

(65) Prior Publication Data
US 2023/0208519 A1    Jun. 29, 2023

(30) Foreign Application Priority Data

Jun. 1, 2020 (GB) ..................................... 2008193
Jul. 15, 2020 (GB) ..................................... 2010911

(51) Int. Cl.
*H04B 10/114* (2013.01)
*H04B 10/80* (2013.01)

(52) U.S. Cl.
CPC ......... *H04B 10/114* (2013.01); *H04B 10/801* (2013.01)

(58) Field of Classification Search
CPC .. H04B 10/114; H04B 10/801; H04B 10/116; H04B 10/502; H04B 10/1143; H04B 10/40; H04B 10/803
See application file for complete search history.

(56) References Cited

U.S. PATENT DOCUMENTS

| 8,098,993 B2 | 1/2012 | Kirkpatrick et al. |
| 12,244,352 B1 * | 3/2025 | Seeley .................. H04B 10/80 |

(Continued)

FOREIGN PATENT DOCUMENTS

| CN | 106788718 | 5/2017 |
| CN | 207559999 | 6/2018 |

(Continued)

OTHER PUBLICATIONS

The International Bureau of WIPO, International Preliminary Report on Patentability dated Dec. 6, 2022 in Application No. PCT/EP2021/064706.

(Continued)

*Primary Examiner* — Hibret A Woldekidan
(74) *Attorney, Agent, or Firm* — SNELL & WILMER L.L.P.

(57) ABSTRACT

An optical wireless communication (OWC) interface apparatus comprises: at least one input and/or output configured to transfer data signals from and/or to a bus device; optical interface circuitry configured to transfer optical wireless communication (OWC) signals representative of the data signals between the OWC interface apparatus and a light transmitter and/or receiver apparatus, wherein the light transmitter and/or receiver apparatus is configured to transmit and/or receive the OWC signals as free-space light signals; and interface control circuitry that is configured to establish and/or maintain communication with the bus device in accordance with a bus protocol thereby to enable (Continued)

transfer of the data signals between the OWC interface apparatus and the bus device.

30 Claims, 7 Drawing Sheets

(56) References Cited

U.S. PATENT DOCUMENTS

2018/0302159 A1* 10/2018 Ritchie .............. H04B 10/1149
2019/0034372 A1   1/2019 Blevins
2019/0386745 A1  12/2019 Ritchie

FOREIGN PATENT DOCUMENTS

| EP | 1507344 | 2/2005 |
| WO | 2004093351 | 10/2004 |
| WO | 2018226534 | 12/2018 |
| WO | 2020074920 | 4/2020 |
| WO | 2020120968 | 6/2020 |
| WO | 2021245097 | 12/2021 |

OTHER PUBLICATIONS

PCT: International Search Report dated Sep. 10, 2021 in Application No. PCT/EP2021/064706.
PCT: Written Opinion of the International Search Authority dated Sep. 10, 2021 in Application No. PCT/EP2021/064706.
European Patent Office, European Office Action dated Apr. 1, 2025 in Application No. 21729554.2.

* cited by examiner

OPTICAL WIRELESS COMMUNICATION APPARATUS AND METHOD

CROSS-REFERENCE TO RELATED APPLICATIONS

This application is a national stage application of PCT/EP2021/064706, filed Jun. 1, 2021, entitled "Optical Wireless Communication Apparatus and Method," which claims priority to GB Application No. 2010911.2, filed Jul. 15, 2020 and GB Application No. 2008193.1, filed Jun. 1, 2020, all of which are hereby incorporated by reference in their entirety for all purposes.

FIELD

The present invention relates to an optical wireless communication apparatus, method and system, for example a LiFi apparatus, method or system.

BACKGROUND

At least some known LiFi communication apparatus can be considered as being composed of two principal blocks: a) a data encoding/decoding block including a data processor and b) and an electrical-to-optical/optical to electrical conversion block including optical transmitter and receiver components, as illustrated schematically in FIG. 1. In some known systems, the latter is also referred to as a light antenna module (LAM).

In known free space Li-Fi communication apparatus, the data encoding/decoding functions of existing mobile communication standards such as WiFi/3G/4G/5G have been considered in the design of LiFi systems. In such approaches, existing wireless communications protocol stacks that enable multiuser access and handover can be reused, which can be beneficial. However, there are point-to-point applications or other applications where these features are not needed. Furthermore, the maximum data rate is always limited by the maximum data rate of the respective mobile communication standard. Another issue with such approaches is that an RF down-conversion circuitry is needed to convert the RF signal into a signal which is fed into the LAM or other electrical-optical conversion components.

LAM modules and other electrical-optical conversion components in Li-Fi systems can, in principle, support significantly higher data rates than existing mobile communication standards but the use of components operating under existing mobile communication standards such as WiFi/3G/4G/5G in a transmitter or receiver chain can impose a performance cap preventing use of such higher data rates or other capabilities that might otherwise be available.

A variety of digital data bus standards are known, for example for transferring data between hardware devices. An example of a digital data bus standard is Peripheral Component Interconnect Express (PCIe) which can be used to provide high speed connectivity between hardware devices, for example between computer system peripherals and a central processing unit (CPU) or for other applications. Connections can be via electrical wired connections, but it is also known to provide PCIe connections using optical fibre or optical waveguides, for example as described in U.S. Pat. No. 8,098,993.

Compared with the use of directly connected, wired optical fibre communication links, free space optical wireless communication can provide communication channels that are more variable in some scenarios. For example, issues can include channel quality degradation caused by misalignment between the light transmitter and/or receiver apparatus, noise and/or interference from background light and/or other optical channels, signal distortion due to the characteristic (e.g. bandwidth) of the different used light transmitter and/or receiver apparatus, (which, in the case of mobile devices, can be dependent on each or each type of mobile device making the optical connection), reduction in signal intensity with free space distance and the apparatus or device characteristic variances due to the different manufacturers. These optical connectivity issues can become more pronounced as the optical link data transfer rate is increased, for example such issues may be expected to increase if data rate levels were to be increased to levels such as those that may be achieved by bus devices using a digital bus protocol.

SUMMARY

In a first aspect there is provided an optical wireless communication (OWC) interface apparatus comprising:
  at least one input and/or output configured to transfer data signals, for example as electrical signals, from and/or to a bus device;
  optical interface circuitry configured to transfer optical wireless communication (OWC) signals representative of the data signals, for example as electrical signals, between the OWC interface apparatus and a light transmitter and/or receiver apparatus, wherein the light transmitter and/or receiver apparatus is configured to transmit and/or receive the OWC signals as free-space light signals; and/or
  interface control circuitry that is configured to establish and/or maintain communication with the bus device, for example in accordance with a bus protocol, thereby to enable transfer of the data signals between the OWC interface apparatus and the bus device.

The apparatus may include the light transmitter and/or receiver apparatus.

The at least one input and/or output may comprise any suitable input and/or output circuitry, for example any suitable input and/or output connectors.

A data bus may comprise a shared digital pathway between pathway connected resources and devices.

A bus device may comprise any device operating in accordance with a bus standard or protocol, for example providing data input or output in accordance with a bus standard or protocol. A bus device may be considered to be a device that communicates using a data bus by way of a bus protocol.

The interface control circuitry may be configured to control operation of the optical interface circuitry and/or the light transmitter and/or receiver apparatus to establish and/or maintain optical wireless communication with a remote device using the free space light signals.

The interface control circuitry may be configured to select and/or vary at least one operating parameter, optionally at least one property of the free-space light signals, for example in order to establish and/or maintain optical wireless communication with the remote device.

The remote device may comprise a mobile device. The interface control circuitry may be configured to monitor quality of communication with the remote device and/or to select and/or vary at least one operating parameter in order to maintain communication with the remote device. The interface control circuitry may be configured to select at least one operating parameter in dependence on at least one property of the device, optionally the type of device.

Quality of communication may comprise signal quality. Quality may vary for example, but not exclusively, due to type of device or configuration or use of different components within a device for example type of OWC-enabled mobile devices that is being communicated with and/or physical issues such as alignment of optical wireless communication devices and/or light interference.

The establishing and/or maintaining of communication may comprise establishing and/or maintaining a communication session in accordance with the bus protocol.

The light transmitter and/or receiver apparatus may be configured to provide a single optical channel or a plurality of optical channels, and the interface control circuitry may be configured to obtain optical wireless communication signals from the received data signals and to direct each optical wireless communication signal to a respective one or more of the optical channels.

Each optical channel may be provided by operation of corresponding LED(s) or other light source(s) and/or different photodetectors. Each optical channel may use light of a different wavelength or range of wavelengths. Each optical channel may have a different direction of transmission and/or reception of light.

The light transmitter and/or receiver apparatus may be configured to provide a single or plurality of optical channels, and the interface control circuitry may be configured to obtain optical wireless communication signals via the optical channels and to direct a plurality of corresponding data signals to the data bus. The optical communication link to another single OWC connected device may therefore comprise multiple optical transmit channels and multiple optical receive channels.

Any suitable data rate may be provided by the or each optical channel, for example depending on the bus device and/or bus protocol and/or number of data lanes used, and/or other properties of the system or user preference. For example, a data rate of between 100 Mb/s and 100 Gb/s, or between 1 Gb/s and 50 Gb/s or 100 Gb/s, or between 2 Gb/s and 20 Gb/s or 50 Gb/s may be provided. Higher or lower data rates may be provided in other embodiments, as desired.

The bus device may comprise at least one device having at least one data lane, and the interface control may be configured to provide the data signals to the data lane(s) and/or to obtain the data signals from the data lanes.

The interface control circuitry may be configured such that each data lane provides data to and/or receives data from a respective two or more of the optical channels.

The interface control circuitry may be configured to inverse multiplex the data signals of a data lane and obtain and direct respective optical wireless communication signals to at least one optical channel and at least one further optical channel. The or an optical communication link to the or a remote device may comprise the at least one optical channel and the at least one further optical channel. The interface control circuitry may be configured to multiplex or combine optical wireless communication signals received from at least one optical channel and at least one further optical channel and provide or direct the multiplexed signals to the data lane.

Thus, a desired data signal rate may be achieved using the combined bandwidth of the at least one optical channel and the at least one further optical channel. The remote device may also be configured to multiplex or otherwise combine the received data signals from the optical channel and at least one further optical channel. The remote device may be configured to inverse multiplex data signals to be transmitted by the remote device, and optionally to transmit the inverse multiplexed signals using the or an optical channel(s) and further optical channel(s).

Inverse Multiplexing of multiple data lane signals over multiple optical channels may be also achieved within one optical communication link.

More than one optical channel may, for example, be used for transfer of data to a remote device where the performance of the transmitter and receiver device or the desired communication distance to the remote device are such that the bandwidth of an optical channel is limiting to the data signal transfer rate.

The encoding and/or modulation scheme of the at least one optical channel and the at least one further optical channel comprising the inverse multiplexed data signals may be the same as that used by the data bus protocol or may be converted into an alternative communication encoding and/or modulation scheme. For example orthogonal frequency division multiplexing (OFDM) may be used.

The interface control circuitry may be configured to provide a desired load, for example a desired resistive load or other desired impedance load, when connected to the data bus, thereby to enable establishment and/or maintenance of communication with the bus in accordance with the bus protocol.

The interface control circuitry may be configured to control a load to the bus, thereby to control establishment and/or maintenance of communication with the bus.

The interface control circuitry may comprise and/or control a variable load, for example a variable impedance. The variable load may comprise a variable resistive load. The interface control circuitry may control the variable load thereby to control establishment and/or maintenance of communication with the bus.

The interface control circuitry may be configured to send and/or receive signals, optionally handshake signals, to and/or from the bus thereby to establish and/or maintain communication with the bus in accordance with the bus protocol.

The interface control circuitry may be configured to monitor for receipt of OWC signals by the light transmitter and/or receiver apparatus, for example via the optical interface circuitry, and/or to establish communication with the bus in response to receipt of an OWC signal.

The interface control circuitry may be configured to monitor for receipt of OWC signals by the light transmitter and/or receiver apparatus, for example via the optical interface circuitry, and, may be configured to, in response to receipt of an OWC signal vary a load presented to the bus; commence a wake-up procedure; send a wake-up signal and/or a handshake signal and/or a communication session request signal to the bus.

The interface control circuitry may be configured to process the data signals to obtain the optical wireless communication signals and/or to process the optical wireless communication signals to obtain the data signals.

The processing can advantageously exclude frequency up-conversion and/or down-conversion. The signals, which thus may not be subject to frequency up-conversion and/or down-conversion may in some contexts be referred to as baseband signals due to the absence of frequency up-conversion and/or down-conversion.

The processing may comprise converting between a first encoding or modulation scheme and a second encoding or modulation scheme, for example between on-off keying (OOK) encoding or pulse amplitude modulation (PAM) and a different encoding scheme/modulation scheme such as for example direct current optical orthogonal frequency division multiplexing DCO-OFDM or variants.

The bus protocol may use at least two signals, optionally signals on at least one data lane, to represent data, for example bi-directional data. The processing may comprise at least one of:

a) the processing of the data signals may comprise utilising the at least two signals provided on at least one data lane conductor to produce at least one corresponding OWC signal for providing to the light transmitter and/or receiver apparatus;

b) the processing of an OWC signal received by the light transmitter and/or receiver apparatus may comprise producing a corresponding signal(s) for providing to conductors of a data lane.

A differential signal may comprise a signal developed between two conductors. For example, a differential signal may be obtained by comparing, subtracting or otherwise processing signals on two or more conductors, for example a pair of conductors of a data bus lane.

The optical interface or the interface controller circuitry may comprise at least one of a differential amplifier, a splitter, and/or a combiner configured to perform at least some of the processing.

The data signals may be encoded and/or modulated using for example on-off keying (OOK) encoding or pulse amplitude modulation (PAM) and/or corresponding data in the OWC signals may also be encoded and/or modulated using for example on-off keying (OOK) or pulse amplitude modulation (PAM).

For example OOK or PAM data signals representing at least some data may be passed by the interface controller circuitry to the light transmitter and/or receiver apparatus without modification of the OOK or PAM encoding such that modulation of the corresponding free space light signals is in accordance with said OOK or PAM encoding.

The bus protocol may use clock and/or control signal(s) and the interface control circuitry may be configured to at least one of:

a) extract clock and/or control signal(s) received from the bus and/or to include corresponding clock and/or control signal(s) in the OWC signals, optionally in a preamble and/or header of the OWC signals;

b) determine clock and/or control data from received OWC signals and/or to provide to the bus corresponding clock and/or control signal(s) that are in accordance with the bus protocol.

Depending on the data bus device capability a clock signal may or may not be required to be extracted from the received optical signal, for example by the interface control circuitry.

The OWC signals may include a representation of any or all layers of the bus communication protocol, for example comprising but not limited to a data link layer and/or PHY layer data that is in accordance with the bus protocol.

The interface control circuitry may comprise at least one signal shaping component, optionally an equaliser and/or a pre-distortion or pre-emphasis device, for example configured to shape the OWC signals provided to the light transmitter and/or receiver apparatus.

The interface control circuitry may comprise at least one other signal shaping component, optionally another equaliser, configured to shape OWC signals received by the light transmitter and/or receiver apparatus.

The OWC free space signals transmitted by the light transmitter and/or receiver apparatus may represent data by a modulation of light of an operating wavelength or range of operating wavelengths, and the at least one signal shaping component, optionally the equaliser, may be configured to control amplitude and/or signal phase and/or timing or other property of the OWC signals, for example OWC electrical signals, provided to the light transmitter and/or receiver apparatus.

The OWC signals received by the light transmitter and/or receiver apparatus may represent data by a modulation of the free space light of an operating wavelength or range of operating wavelengths, and/or the at least one signal shaping component, optionally the equaliser, may be configured to control at least one operating parameter, for example amplitude and/or signal phase and/or signal timing or other property of corresponding OWC signals generated by the light transmitter and/or receiver apparatus responsive to the free space light signals.

The at least one signal shaping component and/or at least one other signal shaping component, may be configured to shape the OWC signals to provide a desired bit error ratio.

The desired bit error ratio may comprise any bit error ratio in an acceptable range or less than an acceptable threshold.

The interface control circuitry may be configured to control the signal amplitude and/or signal levels of "off" state, "on" state, signal characteristics of PAM, spatial modulation and other signal characteristics such as for example signal identity by transmitter index identification of the free-space light signals at an operating wavelength or range of wavelengths, or any other suitable operating parameter.

The interface control circuitry may be configured to directly or indirectly (via the optical interface circuitry) control or modify the signal amplitude and/or signal levels of "off" state, "on" state, signal characteristics of PAM, spatial modulation and other signal characteristics such as for example said amplitude of the free space light signals by control of voltage of LED(s) or other transmission elements included in the light transmitter and/or receiver apparatus, and/or by controlling at least one amplifier that is configured to amplify the OWC signals, for example OWC electrical signals, provided to the light transmitter and/or receiver apparatus.

The interface control circuitry may be configured to switch between transmitting or receiving OWC signals from a transmit or receive channel of the light transmitter and/or receiver apparatus to a further transmit or receive channel of the light transmitter and/or receiver apparatus based on signal quality, for example a reduction in signal quality of a received signal.

The bus device may operate in accordance with a protocol that comprises at least one of a point-to-point protocol, a data bus protocol, a hardware device communication protocol, or a digital interconnect protocol.

The bus device may operate in accordance with a standard or protocol that comprises at least one of a peripheral component interconnect express (PCIe) bus, a Controller Area Network (CAN) bus, a Serial Peripheral Interface (SPI) bus, a Universal Serial Bus (USB), Thunderbolt or Firewire bus, an Ethernet communication protocol.

The PCIe bus may comprise any of a PCIe version such as for example 1.x, 2.x, 3.x, 4.x, 5.x or 6.x bus or a bus according to any other version of PCIe.

The bus device may comprise a PCIe device. A PCIe device may comprise a device that communicates by way of PCIe protocol and may be a single device such as a PCIe endpoint or a multi-function device such as a root complex device with multiple PCIe endpoints, collectors or root points. A PCIe topology may comprise a connection topology of PCIe devices.

The apparatus may be included in a mobile device, optionally configured to communicate with a further mobile device using the free space signals.

The OWC signals may comprise LiFi signals. The OWC free space light signals may comprise modulated visible, infra-red, ultraviolet or terahertz signals. The light transmitter and/or receiver apparatus may comprise at least one LED configured to convert electrical OWC signals to corresponding free-space light signals. The light transmitter and/or receiver apparatus may comprise at least one photodetector to convert received free-space light signals to corresponding electrical OWC signals. The light transmitter and/or receiver apparatus may comprise at least one light antenna module (LAM). The light transmitter and receiver apparatus may be configured to transmit and receive OWC signals over at least two optical channels. The optical channels may be configured for transmission and receipt of optical signals over different optical wavelengths. In certain configurations the light transmitter and receiver apparatus may be configured for transmit or receive only and using one optical channel.

The OWC interface apparatus and light transmitter and/or receiver may comprise part of an OWC system comprising at least one further OWC interface apparatus and further light transmitter and/or receiver. The system may enable connection a further OWC interface apparatus and further light transmitter and/or receiver without use of a data bus switching arrangement.

The OWC interface apparatus may form part of an OWC system comprising further interface circuitry and associated further light transmitter and/or receiver apparatus configured to transmit and/or receive the OWC signals as free-space light signals. The OWC system may comprise a data bus switch configured to switch the further OWC interface apparatus and associated further light transmitter and/or receiver apparatus and connected OWC devices to data connection with the data bus.

Switching and connection of multiple OWC devices to the data bus by the further bus switching apparatus may comprise a process of time division multiplexing.

The switching between the light Tx and/or Rx apparatus and the further apparatus may be dependent on the quality of optical channel transmission or reception.

The further light Tx/Rx apparatus may be configured for optical communication via a data bus connection route at a different location such as for example in switching an OWC connected mobile device to an access point at a different location for better connectivity or in a further example switching to a different OWC link employing a different device protocol such as via an RF link and corresponding communication protocol.

In a further aspect, which may be provided independently, there is disclosed a method of providing optical wireless communication comprising:
transferring data signals, for example as electrical signals, from and/or to a data bus device;
transferring optical wireless communication (OWC) signals representative of the data signals, for example as electrical signals, to and/or from a light transmitter and/or receiver device;
transmitting and/or receiving the OWC signals as free-space light signals by the light transmitter and/or receiver device; and
establishing and/or maintaining communication with the bus device in accordance with a bus protocol thereby to enable transfer of the data signals.

In another aspect, which may be provided independently, there is provided an optical wireless communication system comprising:
more than one optical wireless communication (OWC) interface apparatus as claimed or described herein, including the at least one input and/or output configured to transfer data signals, for example as electrical signals, from and/or to a bus;
corresponding light transmitter and/or receiver apparatus; and
a plurality of OWC devices at a plurality of different locations, wherein the system is configured to provide multiple free space point to point optical communication links via each OWC interface apparatus and a respective OWC devices.

In another aspect, which may be provided independently, there is provided a system comprising at least a first interface apparatus as claimed or described herein, operable to transmit and/or receive the free space light signals to a remote device via at least one optical channel, and a second interface apparatus configured to provide communication with the device or with a further device via at least one further channel optionally provided by at least one further transmitter and/or receiver apparatus.

The second interface apparatus may comprise further interface control circuitry and associated further optical interface circuitry and light transmitter and/or receiver apparatus configured to transmit and/or receive OWC signals as free-space light signals. The data bus may comprise a plurality of data inputs and/or outputs, optionally a plurality of data lanes, and/or at least one of:
a) the interface control circuitry may be configured to control operation to provide communication of data between one or more of the data inputs and/or data outputs and a respective one or more of the optical channels via the optical interface circuitry
b) the interface control circuitry may be configured to, for each of at least some of the data inputs and/or outputs, direct signals between the data input and/or output and a selected respective one or more of the optical channels via the optical interface circuitry.

The at least one optical channel and the at least one further channel may each provide communication with the same remote device. Optical channels may be aligned to transmit to and receive from different directions in free space and the same remote device may make connection with and disconnect from, differently aligned optical channels as the remote device is moved within a position in free space provided by one optical channel to a further position in free space provided by a further optical channel.

The interface control circuitry may comprise a controller configured to switch between transmitting or receiving OWC signals as free space signals from one transmit or receive channel of the OWC interface apparatus to a further respective transmit or receive channel of the OWC interface apparatus. The switching may be determined based on a reduction in signal quality on a received optical channel.

At least some, optionally each, of the data inputs and/or data outputs may be configured to input and/or output data that is independent of data input and/or output by other of the data inputs and/or data outputs.

There may also be provided an apparatus. system and/or method substantially as described herein with reference to the accompanying drawings.

Features in one aspect may be applied as features in any other aspect, in any appropriate combination. For example, device features may be provided as method features or vice versa.

BRIEF DESCRIPTION OF THE DRAWINGS

Embodiments of the invention are now described, by way of non-limiting examples, and are illustrated in the following figures, in which.

DETAILED DESCRIPTION

It is a feature of some embodiments that they provide for direct connection between a PCIe bus and an optical wireless communication (OWC) interface apparatus that in turn is connected to, or forms part of, an OWC free space transceiver, with the OWC interface apparatus and transceiver configured such that data in the form of data signals can be sent directly from or to the PCIe bus and converted to or from free-space light signals transmitted or received by the OWC transceiver without requiring frequency up-conversion or down-conversion and/or advantageously in, some embodiments, without requiring change to the data encoding scheme from that used by the PCIe bus (for example, on-off keying (OOK) encoding or pulse amplitude modulation (PAM)).

The direct connection to the PCIe bus, the absence of frequency up-conversion or down-conversion and/or additional encoding circuitry advantageously can provide lower complexity high data rate free-space OWC, for example upwards of 2 Gb/s or greater in some embodiments.

However In some embodiments the data received under the bus protocol may be converted into an alternative encoding and/or modulation scheme for communication to a remote device over the optical wireless communications channel(s).

Furthermore, in certain embodiments that support multiple free-space optical connection links, there can be provided an extension of a single link PCIe point-to-point connection to a multiple point-to-point link connections by use of PCIe or data bus switching apparatus. Multiple users can be served simultaneously with data being sent or received from selected optical communication links, thus providing OWC networking capability with a PCIe bus. A link may, for example, be a bi-directional connection between two components or devices, which supports at least one interconnecting lane carrying transit and receive signals.

Embodiments are not limited to connection to a PCIe bus and in other embodiments the bus may be any other suitable type of data bus operating, for example, under any suitable point-to-point protocol, databus protocol, hardware device communication protocol, or digital interconnect protocol. The bus can, for example, comprise at least one of a peripheral component interconnect express (PCIe) bus, a Controller Area Network (CAN) bus, a Serial Peripheral Interface (SPI) bus, a Universal Serial Bus (USB) connection, Thunderbolt or Firewire bus an Ethernet protocol according to certain embodiments.

Various features are provided according to particular embodiments to enable the successful establishment and maintenance of communication with the PCIe or other bus, and to obtain suitable signal quality, for example acceptable bit error ratio. Such features according to certain embodiments are discussed further below.

Figure 2A:
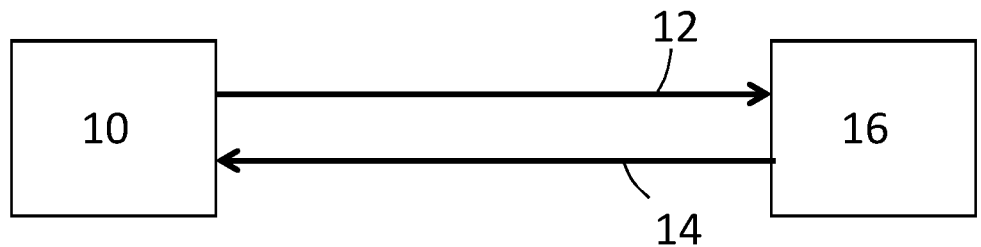
FIG. 2A is a schematic diagram of an optical wireless communication system according to an embodiment.
Figure 2B:
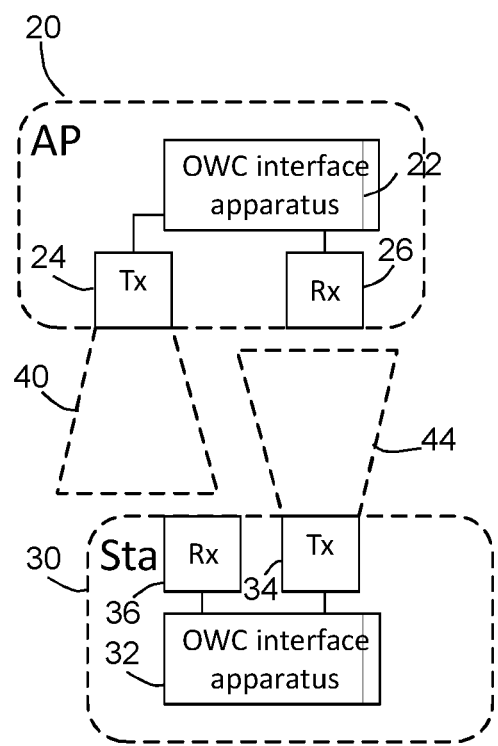
FIG. 2B is a schematic diagram of a wireless communication system according to an embodiment.

Firstly, an OWC system providing connection to a PCIe bus according to certain embodiments is described in overview in FIGS. 2A and 2B. Further details of features of optical interface circuitry and interface control circuitry, including a wireless control block, which may control (both signal shaping and) establishment and maintenance of communication with the PCIe bus are then described in relation to FIGS. 3 and 4a, 4b and 4c.

A further embodiment in which point-to-point multi-link communication is provided by a first technique using multiple PCIe bus direct connections and corresponding respective OWC interface apparatus is then described in relation to FIG. 5.

Figure 5A:
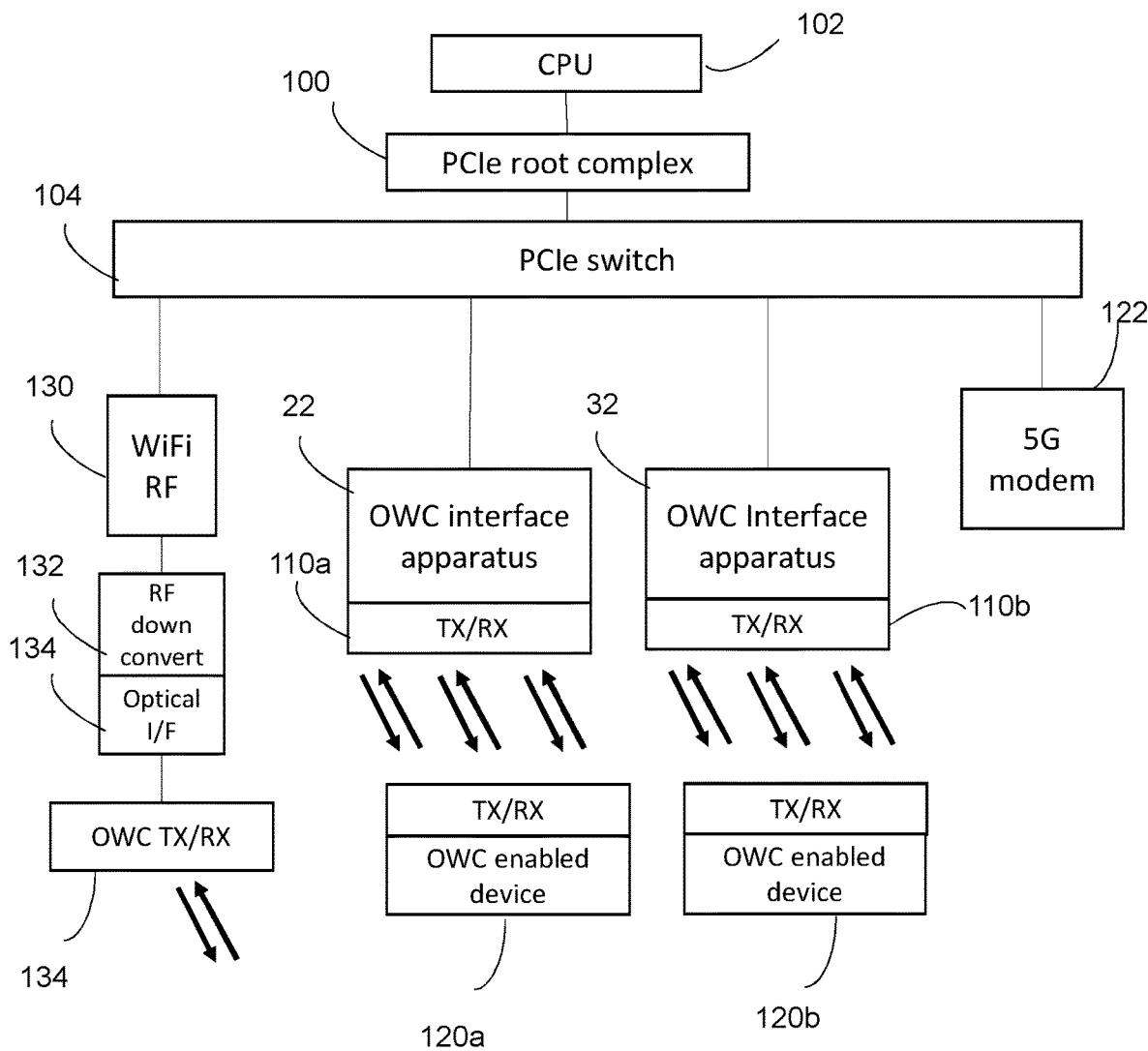
FIGS. 5A-5B are schematic illustrations of wireless communication systems according to further embodiments.
Figure 5B:
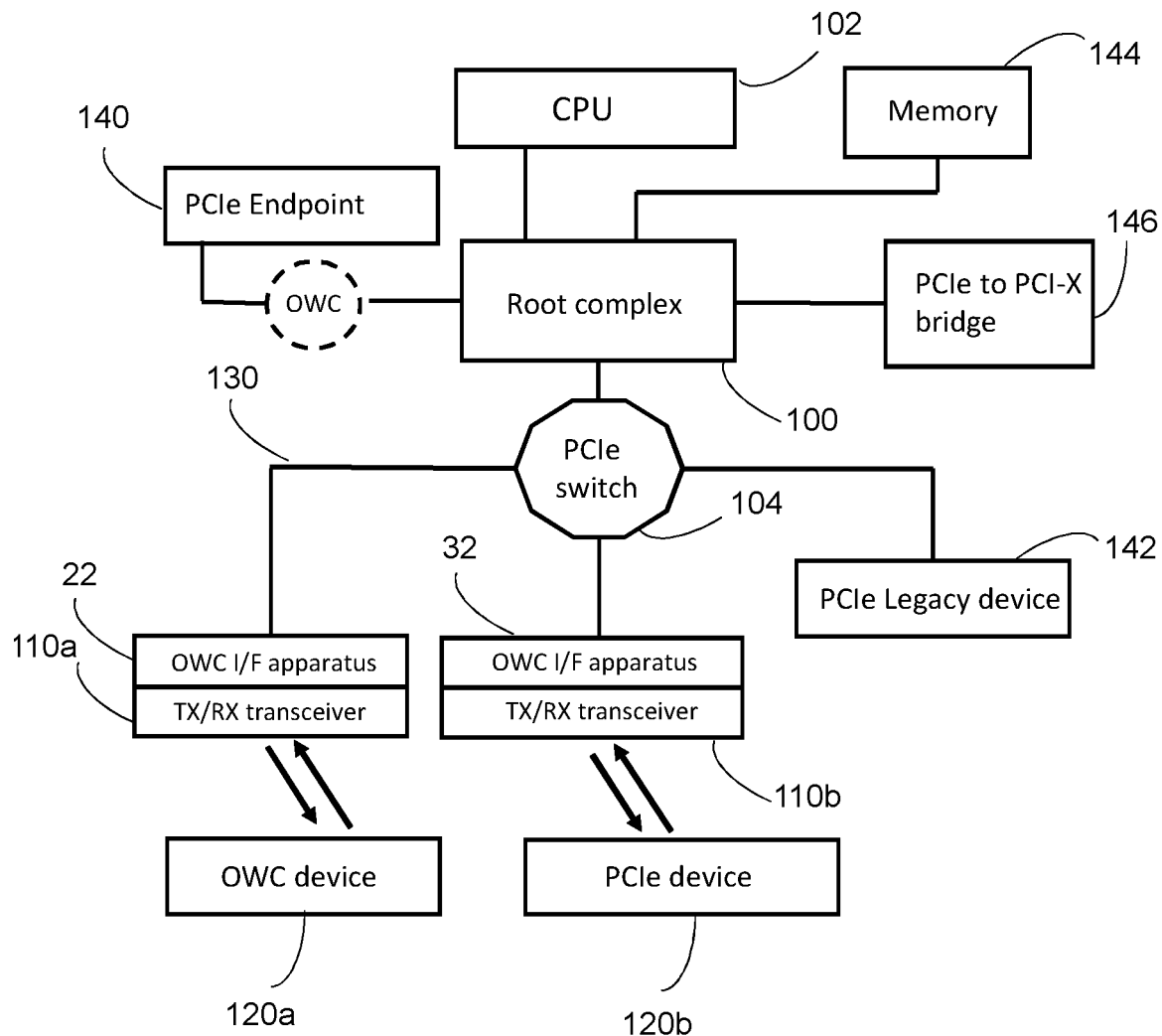

Further embodiments are then described in relation to FIGS. 5A to 5B, in which OWC communication via multiple optical links can be provided using a second technique of connection to the PCIe bus by using a switched connection as shown in FIG. 5B.

FIG. 5A describes an embodiment of an OWC system in which a third technique using R.F. conversion and WiFi/r.f. communication protocols is applied to an additional OWC link. Various modes of operation are provided in which OWC communication can be provided using the first technique and/or the second technique, or switched between using the first technique and the second or third technique, or in which any technique can be modified or supplemented, depending for example on signal quality or system capabilities.

The term light herein may be used, for example, to refer to electromagnetic waves with wavelengths in a range 1 nm to 2500 nm, which includes ultraviolet, visible light and near-infrared wavelengths, and/or with terahertz wavelengths.

FIG. 2A is a schematic block diagram illustrating an optical wireless communication (OWC) link. A first OWC apparatus 10 is configured to send a wireless optical signal in which information is encoded. The first OWC apparatus 10 is configured to send the wireless optical signal through a first optical communication channel 12 to a second OWC apparatus 16. The first optical communication channel 12 is a free-space communication channel. Free space communication channels include transmission of optical signals through air, space, vacuum, liquid such as water or similar. The first optical communication channel has a first characteristic optical wavelength.

The second OWC apparatus 16 is configured to send a further wireless optical signal in which information is encoded. The second OWC apparatus 16 is configured to send the further wireless optical signal through a second optical communication channel 14 to the first OWC apparatus 10. The second optical communication channel 14 is a free-space communication channel. The second optical communication channel may have the same optical wavelength or may have a second characteristic optical wavelength, which is different from the first characteristic optical wavelength.

In the embodiment of FIG. 2A, the first OWC apparatus 10 is an access point (AP) which comprises a transmitter and a receiver. An AP may provide access to a local network and/or an external network. An access point may provide data transmission to and/or from a wired network or a Wi-Fi™ or other wireless network and/or other optical wireless communications network, optionally a LiFi network.

In the embodiment of FIG. 2A, the second OWC apparatus 16 is a station (STA) which comprises a transmitter and a receiver. A station may be portable or fixed. Without limitation, examples of stations include personal computers, laptops, desktops and smart devices, including mobile devices (for example, mobile phones, tablets or digital book readers). Portable stations may be powered by their own battery resource.

The apparatuses 10, 16 may support any suitable bi-directional communication protocol. It is a feature of the embodiment of FIGS. 2A and 2B that each of the apparatus 10, 16 is configured for direct connection to a respective PCIe bus and that data is provided to or from the apparatus 10, 16 via its respective PCIe bus for transmission and/or reception. It is a feature of the embodiment that at least some of the data is transmitted over the optical channels encoded according to the PCIe protocol (for example, encoded using an on-off keying (OOK) encoding or pulse amplitude modulation (PAM) encoding used by the PCIe protocol).

Each of the optical communication channels 12, 14 comprise a respective free-space light communication channel, optionally a LiFi communication channel. A LiFi communication channel may have various desirable characteristics. For example, it may have a range of up to 20 m or more. It has high bandwidth in comparison with for example RF or IrDA (Infrared Data Association) protocols. Full duplex is possible by using two channels and two frequencies or frequency ranges allowing high link throughput because of simultaneous TX and Rx at the same time. Time-division multiplexing of transmitted and received signals may alternatively or additionally be used with respect to one or more channels.

Communication between the apparatus 10, 16 may be configured for multi-channel bi-directional connectivity with each additional optical channel enabling additional transfer of data between the two optical apparatus thereby increasing the overall data transfer rate. In using multiple optical channels data from data bus lanes are assigned to respective optical channels within the optical link between the two devices 10, 16. This can for example be facilitated by means of multiple input multiple output (MIMO) techniques or wavelength division multiplexing (WDM) techniques.

In the context of, for example, but not limited to PCIe, a lane may be a bi-directional data connection. For example, PCIe standards uses a lane with both a transmit differential signal using a pair of conductors and a receive differential signal using a pair of conductors. The differential signal in each case is measured between the pair of conductors.

In some embodiments, the first OWC apparatus 10 may, for example, comprise or form part of an Access Point (AP) device or a luminaire, which may be part of a lighting system. The second OWC station (STA) apparatus 16 may, for example, form part of a user device. The first optical communication channel 12 may be a downlink channel that is used to send information from the AP to the STA. The second optical communication channel 14 may be an uplink channel that is used to send information from the STA to the AP. In other embodiments the OWC apparatuses 10, 16 may each comprise or form part of any suitable device, for example any device configured to transmit and/or receive OWC data. This may include for instance mobile to mobile or AP to AP (referred to as backhaul) communications with the addition of for example a non-transparent bridge enabled chipset to bridge between the PCIe topology in each device.

FIG. 2B is a schematic diagram of an OWC system in accordance with an embodiment. The OWC system comprises an access point (AP) 20 and a station (STA) 30 which are configured for full-duplex communication with each other. The AP 20 may, for example, comprise an apparatus 10 of the embodiment of FIG. 2A, and the STA 30 may, for example, comprise an apparatus 16 of the embodiment of FIG. 2B.

Figure 1:
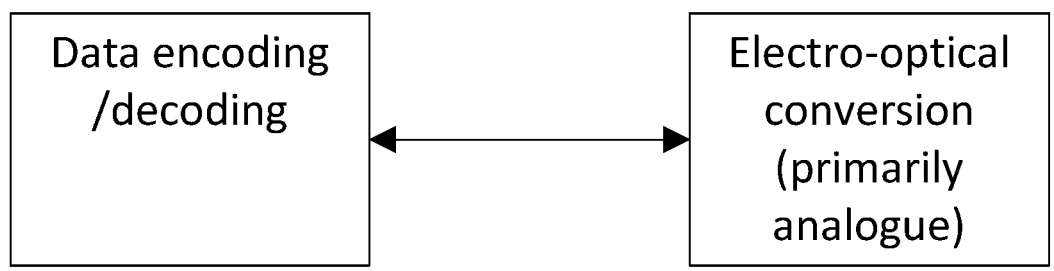
FIG. 1 is a schematic illustration of a LiFi communication device comprising a data encoding/decoding block including a data processor and b) and an electrical-to-optical/optical to electrical conversion block.

Considering at the structure of the system in more detail, the AP 20 (for example, provided in the form of apparatus 10 of FIG. 1A) comprises OWC interface apparatus 22, an AP transmitter 24, and an AP receiver 26. In some embodiments the transmitter 24 and receiver 26 may make up, or form part of, a light antenna module (LAM).

The OWC interface apparatus 22 is configured to receive data in the form of a data signal from, and provide data in the form of a data signal to, a respective PCIe bus (not shown) to which the AP 20 is connected, via input and/or output circuitry (e.g. via a PCIe connector or other wired connection).

With regard to the data signal received from the PCIe bus, after passing the signal through relevant components of interface control circuitry components and optical interface circuitry and, the OWC interface apparatus 22 outputs a modulation signal that comprises or is representative of the data. The modulation signal may be referred to as an OWC/signal in the form of an electrical signal, or vice versa. The data provided via the PCIe bus may be obtained from any suitable data source or data store and/or from a local or external network.

The modulation signals (which may be referred to as OWC signals) are used to modulate light output by the AP transmitter 24 thereby to transmit the transmit the OWC signals as free-space light signals.

The OWC interface apparatus 22 comprises mixed circuitry in the form of an amplification chain, at least one power supply and at least one driver (all not shown). Depending on data bus device hardware and protocol, it is an important feature of the embodiment of FIG. 2B that, for resilient and enhanced free space optical communication, the optical interface circuitry of the OWC interface apparatus 22 additionally is connected to interface control circuitry, that is configured to control operation of the circuitry and to establish and/or maintain communication with the PCIe bus in accordance with a bus protocol thereby to enable transfer of the data signals between the optical interface circuitry and the bus. In the embodiment of FIG. 2B the interface control circuitry additionally may provide analogue filtering, signal control circuitry, clock signal recovery, a digital to analogue converter, an analogue to digital converter, and may include at least one signal shaping component, optionally an equaliser and/or a pre-distortion or pre-emphasis device configured to shape the OWC signals provided to the transmitter 24. The interface control circuitry may include a processing resource, for example a dedicated processor, configured to control operation of the interface control circuitry and other components of the optical interface circuitry as necessary. In other embodiments, some of the components listed above may be omitted from the optical interface circuitry and interface controller circuitry and/or further components not listed may be present.

The operation of the interface control circuitry components is discussed in more detail in relation to FIGS. 3 and 4a to 4c below.

The AP transmitter 24 comprises a light source (not shown), which is configured to emit modulated light having a first characteristic wavelength. The AP transmitter 24 further comprises circuitry (not shown) which is configured to drive the first light source to emit light having an intensity that is modulated in accordance with the modulation signal (e.g. the OWC electrical signal) provided by the optical interface circuitry 22. The light source may comprise any suitable light source, for example an LED, a laser, for example a VCSEL (vertical-cavity surface-emitting laser), or an LEP (light-emitting plasma). The light source may comprise a plurality of light sources, for example an array of light sources.

The AP receiver 26 comprises at least one photodetector (not shown) which is configured to detect modulated light having a second characteristic wavelength. Any suitable photodetector or photodetectors may be used. For example, the AP receiver 26 may comprise at least one Si PIN photodiode, silicon photomultiplier (SiPM), single photon avalanche diode (SPAD), Graphene-CMOS high-resolution sensor or avalanche photodiode (APD).

The AP receiver 26 further comprises receiver circuitry that is configured to obtain a signal from the photodetector that is representative of the light received by the photodetector, and to provide the receiver signal to the optical interface circuitry 22.

The OWC interface apparatus 22 receives the receiver signal from the AP receiver 26 and passes the received signal through relevant components of the optical interface circuitry including amplification and provides the resulting data signal to the PCIe bus via the interface control circuitry. As already noted, the interface control circuitry (which may also be referred to as a wireless control block control) establishes and/or maintains communication with the PCIe bus in accordance with the bus protocol. As discussed further below, in relation to the receiver signal, the interface control circuitry may be configured to, amongst other things, extract clock and/or other control signals from the receiver signal and provide them to an appropriate data lane on the PCIe bus.

Turning to the STA 30 (for example, provided in the form of apparatus 16 of FIG. 2A), the STA 30 comprises OWC interface apparatus 32, a STA receiver 36, and a STA transmitter 34. The OWC interface apparatus 32 is configured to receive data from and provide data to a respective PCIe bus (not shown) to which the STA 30 is connected, via input and/or output circuitry (e.g. via a PCIe connector or other wired connection) In the embodiment of FIG. 2B the components and function of the OWC interface apparatus 32, STA receiver 36, and STA transmitter 34 are the same or similar to those of the corresponding components of the AP 20. Thus, the OWC interface apparatus 32 comprises optical interface circuitry and interface control circuitry. In more detail, the OWC interface apparatus 32 includes mixed signal circuitry signal circuitry, a digital to analogue converter, an analogue to digital converter, an amplification chain, at least one analogue filter, at least one power supply and at least one driver (all not shown). For different bus devices, hardware and protocols it is an important feature of the embodiment of FIG. 2B that for resilient and reliable data transfer using optical free space communication, as with the optical interface circuitry of the AP 20, the optical interface circuitry of the STA 30 is connected with interface control circuitry, that is configured to control operation of the circuitry and to establish and/or maintain communication with the PCIe bus in accordance with a bus protocol thereby to enable transfer of the data signals between the optical interface circuitry and the bus. In the embodiment of FIG. 2B the interface control circuitry additionally may provide analogue filtering, signal control circuitry, clock signal recovery, a digital to analogue converter, an analogue to digital converter and may include at least one signal shaping component, optionally an equaliser and/or a pre-distortion or pre-emphasis device configured to shape the OWC signals provided to the transmitter 24. The interface control circuitry may include a processing resource, for example a dedicated processor, configured to control operation of the interface control circuitry and other components of the OWC interface apparatus 32 as necessary. In other embodiments, some of the components listed above may be omitted from the optical interface circuitry and controller interface circuitry and/or further components not listed may be present.

The STA receiver 36 comprises a photodetector (not shown) that is sensitive to light Photodetectors that are sensitive to a broad spectrum of light are known. For example, a photodetector may be sensitive to ultraviolet, visible and infrared wavelengths. In one embodiment, the STA receiver 36 comprises at least one APD (avalanche photodiode). In other embodiments, the STA receiver 364 comprises at least one Si PIN photodiode. In further embodiments, the STA receiver 36 may comprise any photodetector that is capable of receiving light of suitable frequencies. For example, the STA receiver 36 may comprise at least one Graphene-CMOS high-resolution sensor. In further embodiments, the STA receiver 36 may comprise at least one silicon photomultiplier (SiPM) or single photon avalanche diode (SPAD) as the photodetector.

The STA receiver 36 further comprises circuitry (not shown) which is configured to receive a signal from the photodetector that is representative of modulated light received by the photodetector and to output a receiver signal to the optical interface circuitry 32.

The OWC interface apparatus 32 is further configured to receive the receiver signal from the STA receiver 36 and provide a corresponding data signal to the respective PCIe bus, in corresponding manner to that described in relation to the AP 20.

The OWC interface apparatus 32 is further configured to obtain digital or analogue data for uplink transmission. For example, the OWC interface apparatus 32 may obtain data from an input by a user of a device in which the STA 30 is incorporated, or from processes running in the device in which the STA 30 is incorporated. The data is provided to the optical interface circuitry via the corresponding PCIe bus. The optical interface circuitry is configured to output a modulation signal that comprises or is representative of the data.

The STA transmitter 34 is used to transmit modulated light. The STA transmitter 34 comprises a light source which is configured to emit modulated light having the second characteristic wavelength. In other embodiments, any suitable wavelength or range of wavelengths may be emitted by the STA transmitter 34. The STA transmitter 34 further comprises circuitry (not shown) which is configured to receive a modulation signal and to drive the light source of the first STA transmitter 34 to emit light having an intensity that is modulated in accordance with the modulation signal.

The light source of the STA transmitter 34 may comprise any suitable light source, for example a laser, for example a VCSEL (vertical-cavity surface-emitting laser) or a laser diode, or an LEP (light-emitting plasma). The light source of the STA transmitter 34 may comprise a plurality of light sources, for example an array of light sources.

As mentioned above, an important feature of the embodiments of FIG. 2B is that the OWC interface apparatus 22 and OWC interface apparatus 32 each include interface control circuitry, which is configured to control operation of the circuitry and to establish and/or maintain communication with its respective PCIe bus in accordance with a certain bus protocol. In certain embodiments STA and AP optical wireless communication may occur over more than one optical channel and the interface control circuitry of the OWC interface apparatus co-ordinates data transmission and reception from and to multiple bus lanes from and to respective multiple optical channels.

Figure 3:
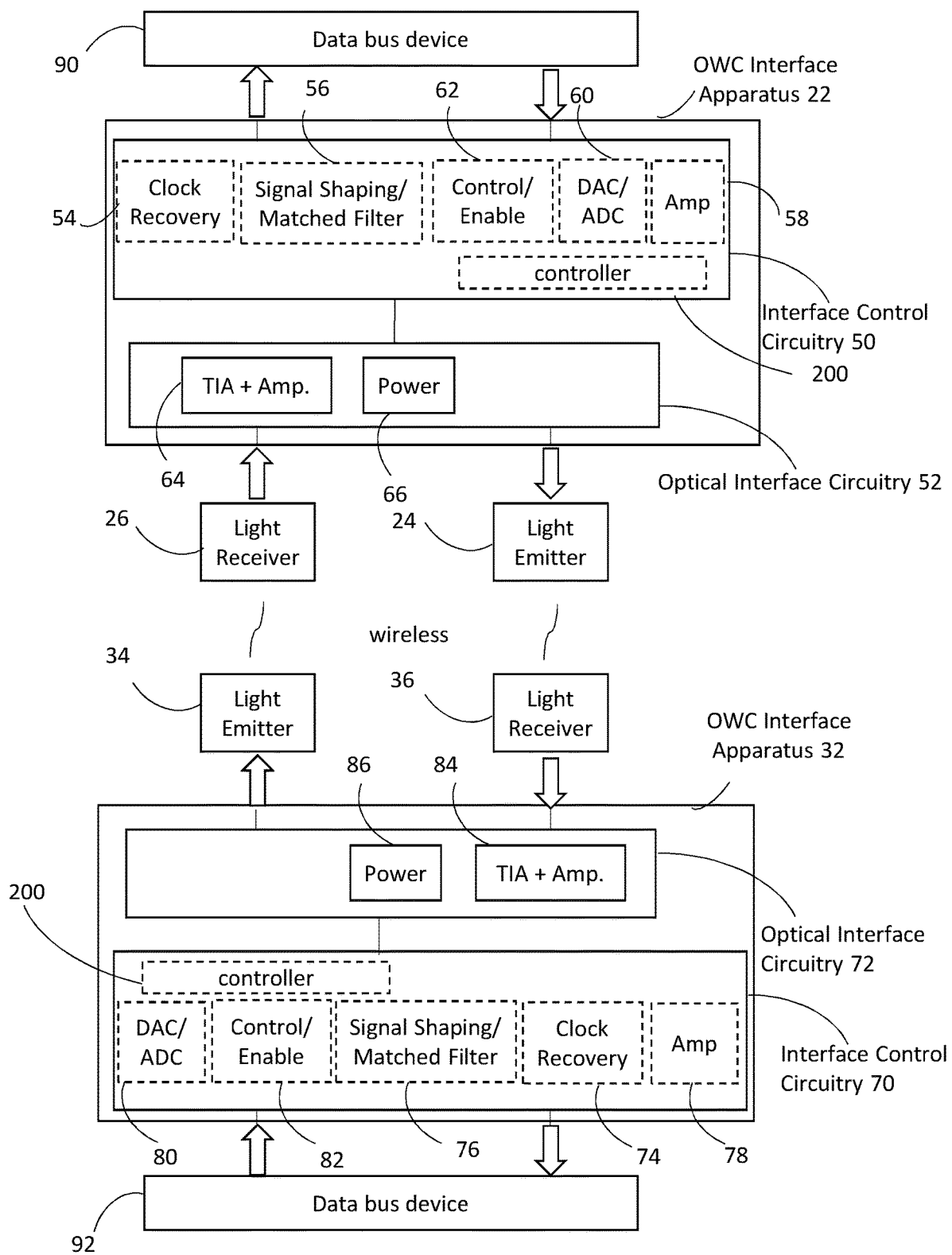
FIGS. 3 and 4A to 4C are schematic illustrations of a wireless communication system according to a further embodiment.

The embodiment of FIG. 2B is further illustrated schematically in FIG. 3, in which the interface control circuitry (which may also be referred to in this embodiment as wireless control blocks) 50 of OWC interface apparatus 22 and interface control circuitry (e.g. wireless control blocks) 70 of OWC interface apparatus 32 are shown. The interface control circuitry 50 (and 70) are shown schematically in FIG. 3 as one unit for processing, or otherwise controlling operations in relation to, received and transmitted signals. It will be appreciated that interface control circuitry may be configured as separate components for receive signals and transmit signals and/or that multiple optical channels may share the same interface control circuitry.

The interface controller circuitries 50, 70 of the embodiment of FIG. 3 may also include clock and data recovery (CDR) modules 54, 74, amplifiers, for example adjustable gain control amplifiers 58, 78, analogue-to-digital (ADC) and/or digital-to-analogue (DAC) components 60, 80, and control/enable modules 62, 82. As discussed further below, only some of these components may be required, or may be selected for use, in some embodiments, for example depending on properties of the free space optical channels, or data or quality requirements, or the nature of the devices in which the interface apparatus 22, 32 is included or the applications for which the transmission and reception of data is being used.

The optical interface circuitries 52, 72 can includes components, for example, to operate or provide signals to or from the transmitters 24, 34 and receivers, and/or for outputting/receiving signals to/from outputs/inputs of the apparatus 22, 32 thereby to connect to the data bus devices 90, 92. In the embodiment of FIG. 3, the optical interface circuitries 52, 72 include transimpedance amplifiers and/or other amplification circuitry 64, 84 and a power source 66, 86 for powering the apparatus 22, 32 and/or for providing power to the transmitters and receivers 24, 26, 34, 36.

PCIe bus devices 90, 92 are also shown in FIG. 3.

Any suitable PCIe bus or protocol may be used in embodiments, for example any PCIe bus or protocol in accordance with any specification documents published by the Peripheral Component Interconnect Special Interest Group (PCI-SIG). For example, any of any of PCIe version 1.x, 2.x, 3.x, 4.x, 5.x or 6.x may be used.

In accordance with standard PCIe specifications, the PCIe bus includes a plurality of data lanes, each having a respective transmit and receive data signal. The bus also includes, amongst other things, dedicated lane(s) for carrying clock, reset and other control signals. The clock or other control signals can be common to all, or a group of, data lanes.

It is not straightforward to successfully apply PCIe buses to a wireless medium, in part because of the different bus device requirements in addition to the need for superior optical high data rate transfer which may require the need to provide suitable clock, reset or other control signals on appropriate lanes in order successfully to establish and maintain communication via the bus in accordance with the PCIe protocol.

In PCIe for example, there is a 'Receiver Detect' functionality in relation to data transmission via the bus, which checks if a receiver is present (for example that a suitable receiving component is connected to the bus).

This 'Receiver detection' is a feature of PCIe PHY. Each PCIe transmitter, at the commencement of linkup, produces a low frequency pulse signal on each of the differential TX outputs. The transmitter includes a simple detection circuit to monitor the line response to this ping signal. With no suitable receiving device attached, the rising rate (and amplitude) of the signal is much higher than when a suitable receiving device is present. Because the specification has a defined range of coupling capacitance and receiving device termination, thus a distinct, detectable time constant range defines when a suitable receiving device is present or not.

If this check returns a negative response, any transmission is blocked. This 'Receiver Detect' circuitry requires a suitable wired connection to the PCIe bus be present. In particular, it can be necessary to ensure that the PCIe device 90 (or PCIe device 92) sees a specific impedance on the appropriate lane(s) for example when the regular low frequency signal is sent on the input for each data lane, or for particular data lanes.

In the embodiment of FIG. 3, the interface control circuitry 50 is configured to provide a desired load (e.g. a 500 load) when connected to the bus, or relevant lanes of the bus, thereby to enable establishment and maintenance of communication with the bus in accordance with the PCIe protocol.

In some modes of operation, the interface control circuitry 50 is configured to selectively control the load presented to the bus, for example by controlling a variable impedance using the control/enable module 62, thereby to control establishment and/or maintenance of communication with the bus. For example, the interface control circuitry 50, for instance using the control/enable module 62, can monitor for receipt of OWC signals via the receiver 26 and establish communication with the PCIe bus in response to receipt of an OWC signal, for example by controlling the load presented to the PCIe bus and/or by sending handshake, wake-up, communication session request or other signals to the bus. The receipt of the OWC signal may be performed using any suitable technique. For example, in some embodiments energy detection may be used to detect receipt of an OWC signal of at least threshold amplitude at an operating wavelength without, or prior to, decoding the received signal.

A wake-up procedure (for example, moving components of the optical interface circuitry 52 and/or components of the PCIe device 90 or associated with the PCIe bus from a lower power state to a higher power state) can be initiated by theOWC interface apparatus 22 50 in response to the receipt of a suitable OWC signal via the receiver 26. Thus, operation could be based on a wireless handshake between the receiver and the transmitter prior to the start of data transmission.

Under most versions of the PCIe protocol, transmit or receive data on each data lane is sent as a differential signal on a pair of conductors. In the embodiment of FIG. 3, on the receive side, the circuitry included in the optical interface circuitry or optionally the interface control circuitry (e.g. wireless control block) 50 can be used to generate a differential signals from a single received OWC signal with the differential signal then being passed to the pair of conductors of the corresponding data lane of the PCIe protocol data bus On the transmit side the interface control circuitry 50 may optionally include differential amplifier(s) receiving a differential signal from a pair of conductors which form the transmit signal carried by the data lane.

As mentioned above, with certain PCIe devices the protocol may include clock, reset and other control signals, for instance PERST signals as one example, that can for example be provided on dedicated clock or other lanes and that can be common to all, or a group of, data lanes. In the embodiment of FIG. 3, the clock and data recovery module 54 is responsible for ensuring that clock and any other necessary control signals that should, from the perspective of the PCIe bus under the PCIe protocol, be associated with the data received in the OWC signal are provided to the PCIe endpoint 90 or 92 to enable correct operation under the PCIe protocol.

In the embodiment of FIG. 3 the OWC signals have a packet structure that is the same as that of the packet structure of the PCIe protocol and for example include data link and PHY layer data that is in accordance with the PCIe protocol.

However, the PCIe control data, including clock data, that is included in the OWC signals sent as free space light signals can vary between embodiments. In the embodiment of FIG. 3 the control data that is included in the free space OWC signal received by the receiver 26 will depend on operation of the interface control circuitry 70 of the STA 30 or other apparatus that transmitted the OWC signal.

Thus, depending on the characteristics of the received free space OWC signal or the requirement of the PCIe protocol or data bus device, the clock and data recovery (CDR) module 54, either generates clock or other control signals locally, or extracts them from the received OWC signal (for example, from a preamble, header or payload of the signal) or receives them separately for example in a separate, dedicated OWC signal transmitted by STA 30 or other apparatus. For example, the clock and data recovery (CDR) module 54 can be used to reconstruct a clock signal from the received OWC data, with the resulting clock signal then being fed as a reference clock to the PCIe endpoint 90.

Similarly, on the transmit side the interface control circuitry 50 in certain embodiments can be configured to extract selected control signals received from clock or control lanes of the PCIe bus and include them in a preamble or header or in a selected part of the payload of the OWC signal, with the OWC signal payload also containing data obtained from a data lane of the PCIe bus. Alternatively, the interface control circuitry 50 could omit such control data and rely on it being generated on the receive side, or it could transmit such selected control signals in a separate, dedicated transmission signal.

Depending of the data bus device capability a clock signal may or may not be required to be extracted from the received optical signal by the interface control circuitry.

In addition to establishing and maintaining communication with the PCIe bus, and managing clock and control signals, the interface control circuitry 50 also includes signal shaping component(s), for example an equaliser and/or a pre-distortion or pre-emphasis device or matched filter configured to shape the OWC signals provided to the transmitter 24 and/or received from the receiver 26. Signal shaping blocks 56, 76 included in the interface control circuitry 50, 60 respectively are illustrated schematically in FIG. 3, as already mentioned above. The signal shaping blocks 56, 76 (for example equalisers and/or pre-distortion or pre-empha-sis devices or matched filters) are used in order to counteract the frequency selective nature of the optical channels.

The OWC free space signals represent data by a modulation of light of an operating wavelength or range of operating wavelengths, and the at least one signal shaping component, optionally the equaliser, are configured to control amplitude or other property of the OWC electrical signals provided to the light transmitter and/or receiver apparatus.

In practice, the use of signal shaping components can provide a desired bit error ratio for example a bit error ratio in an acceptable range or less than an acceptable threshold, or any other desired level of signal quality.

The analogue signal out of the transmitter is on/off encoded/modulated as mentioned and there can be a minimum delay requirement for this analogue signal. For example, in some embodiments if the delay is too big, for example a receiver return message is delayed, then communication may fail to be established. The use of signal shaping components can reduce bit error rate, for example, and reduce delays in data being received successfully and/or completely. This has been found important for free space connection to data bus connection where the optical signal may be distorted unlike the optical signal received with a guided or wired direct point to point optical link such as a via a fibre optic cable.

Embodiments are described in which modulation and/or encoding of the data from the PCIe bus is preserved in the corresponding free space optical wireless communication signals. In alternative embodiments any other suitable communication protocol, for example IEEE 802.15.7, 802.15.13, 802.11 or extensions or developments thereof; ITU-T G.9960 or extensions or developments thereof; or ITU-T G.vlc or extensions or developments thereof may be utilised or implemented. In such embodiments, data received under PCIe or other bus protocol may be converted into said other suitable communication protocol, or vice versa, before, or after, transmission via free space. The conversion between protocols may provide benefits for particular applications but may also slow down the maximum achievable data rate.

In certain embodiments, the PCIe data signal, e.g. on/off keyed data signal, can be fed into a dedicated PHY layer optimised for the optical channel (for example, using OFDM or other suitable encoding) and then send that in an optimised shape/form (and for example using OFDM) over the optical channel. The signal can be converted back into the on/off keyed signal at the receiver using OFDM decoding. There can be included the signal shaping components.

The signal shaping components according to certain embodiments can be selectively operated in dependence, for example on signal quality, to ensure that there is an acceptable communications link. For example, if the optical components have a bandwidth in operation good enough to provide an acceptable quality link without pulse shaping then the signal shaping components may be not used. In circumstances where signal quality is not good enough then the signal shaping components may be operated for example to provide suitable shaping of pulses. The signal quality may be determined using any suitable known techniques, and may be determined automatically and/or periodically, for example by the interface control circuitry or by a separate processing component. The interface control circuitry may, for example, include a controller 200 in the form of a processor, for any suitable programmed processor or as dedicated circuitry, for example one or more ASICs (application specific integrated circuits) or FPGAs (field programmable gate arrays) to control some or all operations of the apparatus or components of the apparatus. In other embodiments the functions of the controller are distributed across multiple components of the apparatus, for example each including a suitably programmed processor or dedicated circuitry. In some embodiments, some or all functions of the controller 200 can be provided by at least one external processor or dedicated control circuitry.

Quality may be assessed based on error rates or data rate or other parameters in respect of the signals. Alternatively or additionally, one or more signal parameters may be measured, for example received signal amplitude or signal to noise ratio or eye diagram or other parameter of received signals may be measured, to determine signal quality.

Signal quality may, for example, comprise or be representative or derived from such parameters.

In the case where PCIe v1.1 is used to support a data rate of 2.5 Gb/s then to work without the equaliser the optical system needs bandwidth of 1.25 GHz, otherwise an equaliser may be needed in some embodiments.

It has been found that the equaliser requirements can depend on beam spot size (e.g the cross-sectional size at the receiver of the beam of the light used for the OWC communication). For example, for a point to point link of a certain distance (e.g. 3 m)—then with a particular equaliser then a larger beam spot size can be used and achieve the BER required for that PCIe standard—or could have a smaller spot size with lesser equaliser requirements to obtain the same BER.

In certain embodiments, signal strength is adjustable. For instance, the optical interface circuitry is also configured to control the amplitude of the free space light signal emitted by the transmitter, for example by changing the gain at the or an amplifier and/or by changing signal voltage for the transmitter and/or in any other suitable manner. For example, in embodiments according to FIG. 3, the output optical power of the transmitter can be increased or dimmed by adjusting a bias voltage applied to LED(s) of the transmitter and/or by using the adjustable gain control amplifier 58, 78 and using it to vary output power of the transmitter. In some embodiments, varying the signal voltage or other control parameters of the transmitter the load seen by the PCIe device 90, 92 can vary and this can, in some embodiments be used to vary the load to or from a value (e.g. 50 ohms) that is required to establish and maintain communication under the PCIe protocol. In some embodiments this could be used to initiate wake-up procedures and/or to control movement between higher power and lower power operational states of component(s) of the system.

It can be understood from the description of the embodiments of FIG. 3 that the interface control circuitry 50 can act as an enabler, mediator and signal shaper to enable a wired data bus to be used for a wireless data link. Description of the OWC interface apparatus in relation to FIG. 3 above has primarily concerned the interface control circuitry 50. Certain functional elements of the interface control circuitry may be adopted by the optical interface circuitry and vice versa according to certain embodiments.

As noted above, only some of the components of the OWC interface apparatus 22, 32 may be required, or may be selected for use, in some embodiments, for example depending on properties of the free space optical channels, or data or quality requirements, or the nature of the devices in which the interface apparatus 22, 32 is included or the applications for which the transmission and reception of data is being used.

Figure 4A:
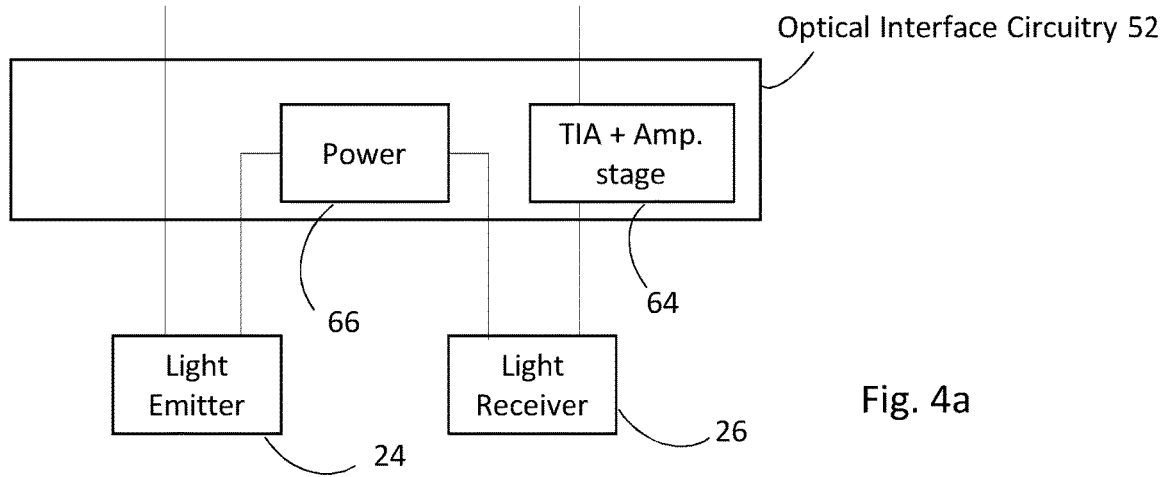
Figure 4B:
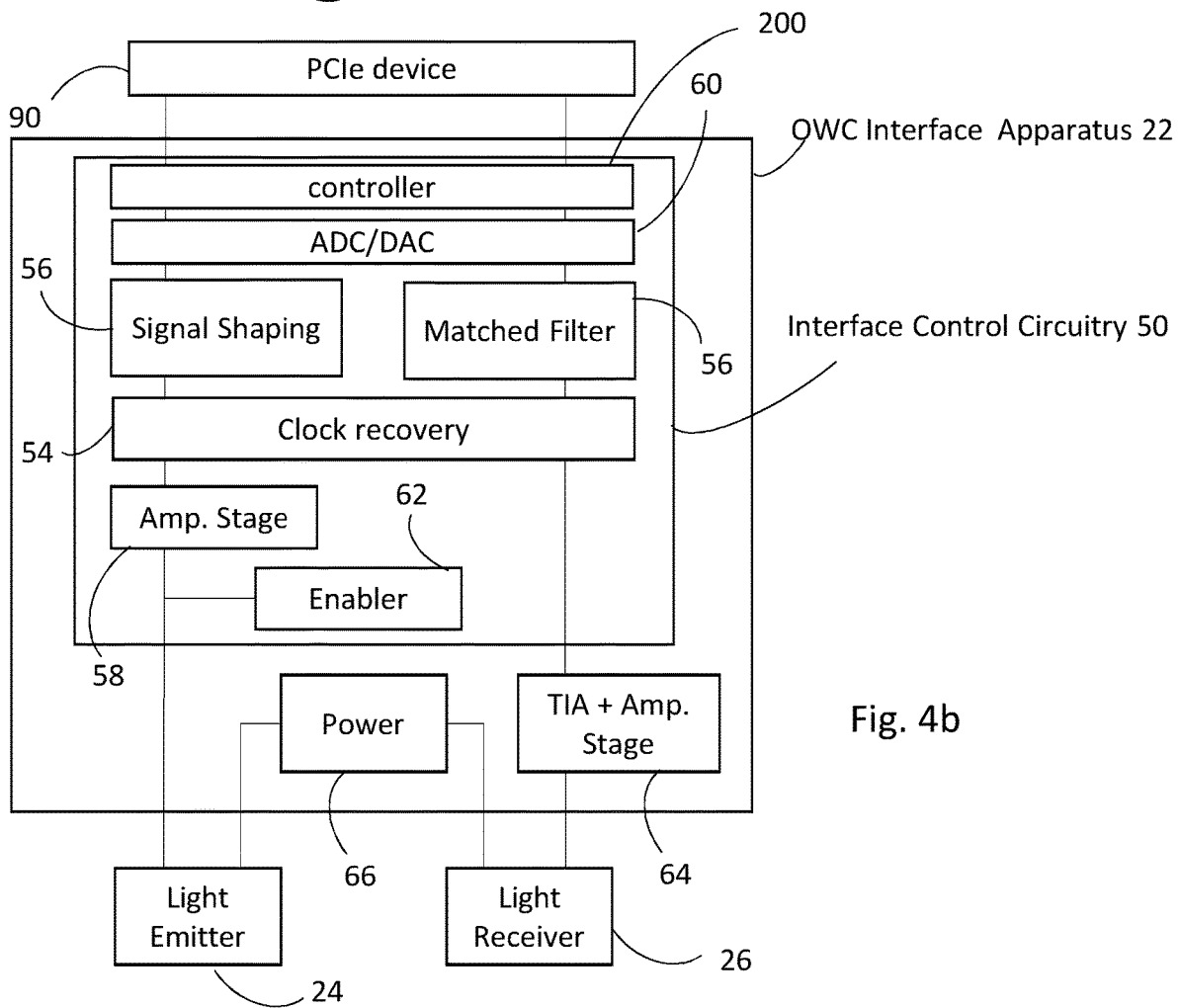
Figure 4C:
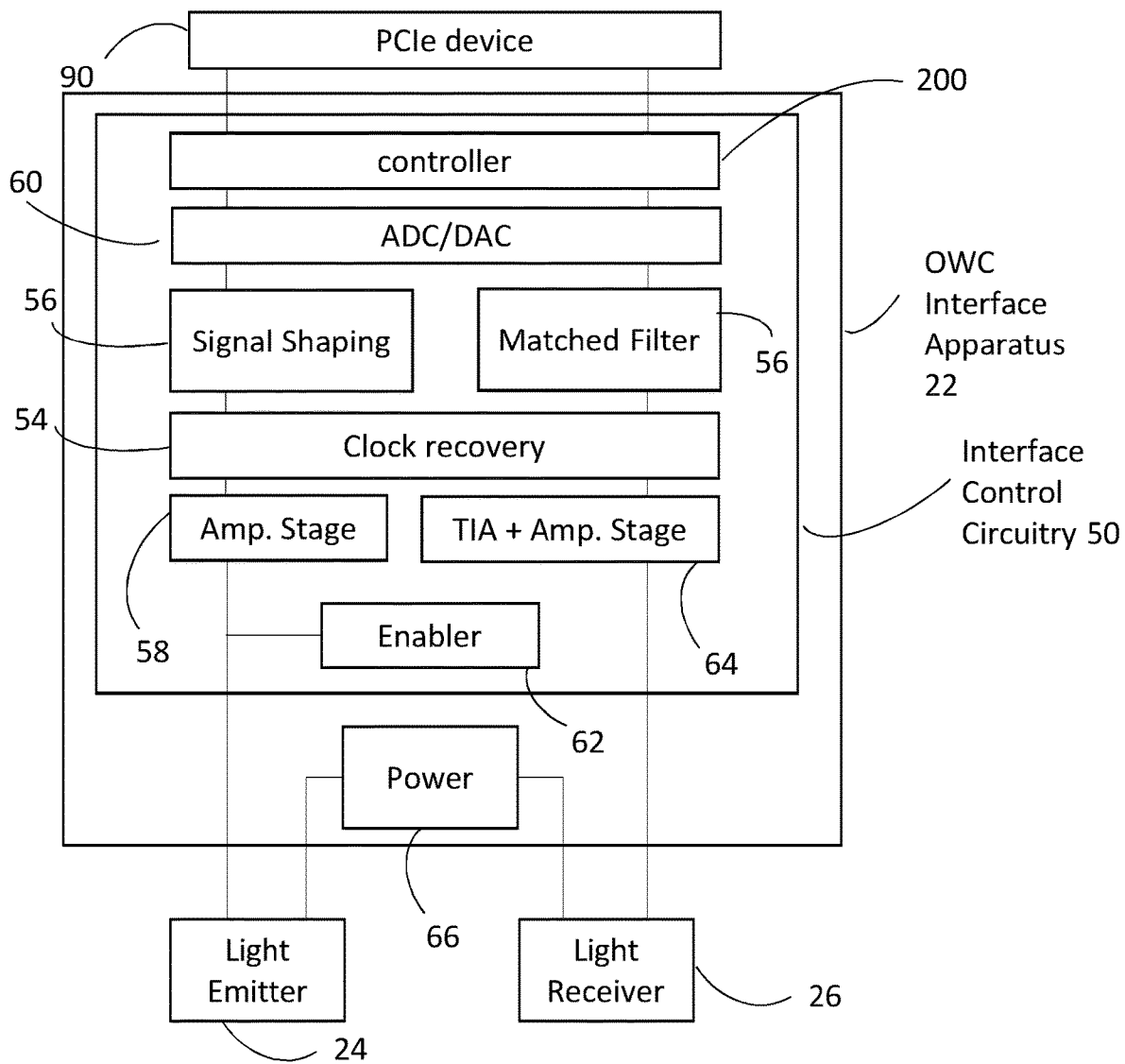

FIGS. 4a to 4c illustrate schematically various embodiments in which particular components are selectively used, or included, in the OWC apparatus 22.

In the embodiment of the FIG. 4a, data is passed directly from/to the data bus device 90 via the inputs/outputs of the OWC interface apparatus 22 to/from the optical interface circuitry 52. The application circuitry 64 and power source 66 ensure amplification of signals and powering of the apparatus and the receiver 26 and transmitter 24. However none of the signal shaping, enabling or DA/AD conversion are performed. Instead, data signals are passed directly to/from the transmitter 24 or receiver 26 with little or no processing other than amplification if necessary. In this embodiment, the interface control circuitry 50 only has a function of passing signals through without modification and/or powering up or down the optical interface circuitry or other components. It has been found that in some cases, depending for example on signal quality requirements and the bus standard used, that direct connection between the bus device 90 and the OWC transmitter 24 and receiver 26 as illustrated in FIG. 4a can provide for acceptable OWC free space communication subject to suitable amplification.

FIG. 4b is a schematic illustration of a further embodiment in which, in contrast to the embodiment of FIG. 4a, the clock and data recovery (CDR) module 54, the adjustable gain control amplifier 58, the DAC/ADC 60 and control/enable module 62 are all used as discussed in relation to FIG. 3 to provide signal shaping, establishment and maintenance of communication with the bus device 90, for example under the PCIe protocol, and maintenance of signal quality. In the embodiment of FIG. 4b, the DAC/ADC 60 may be used for example in embodiments where a signal is required to be changed to a different modulation scheme or technique or for example in the case where signal processing is required such as digital equalisation and the analogue signal must first be converted into the digital domain. The D/A function may then be used after the signal has been digitally processed such as for example after equalisation.

In other embodiments no D-to-A or A-to-D conversion is used.

FIG. 4c is a schematic illustration of a variant of the embodiments of FIG. 4b, in which the same components are provided, but in which the amplification circuitry 64 is provided as part of the interface control circuitry 50 rather than the optical interface circuitry 52.

In other embodiments any one or more components can be provided either as part of the interface control circuitry 50 or as part of the optical interface circuitry 52. Any of the functionalities of embodiments can be provided by either or both the interface control circuitry 50, the optical interface circuitry 52 or combination of them. The interface control circuitry 50 and the optical interface circuitry 52 can be provided as a single combined apparatus in some embodiments.

Description in relation to FIGS. 3 and 4 has concerned communication between two devices, for example AP 20 and STA 30. It is an important feature of certain embodiments that communication can occur with multiple OWC linked bus devices linked to a data bus These devices may be directly connected to the data bus or connected by way of a bus switch. Thus, as mentioned above, there can be provided an extension of a single link PCIe, or other data bus point-to-point connection. Multiple users can be served simultaneously with data from particular lanes being sent to or from selected corresponding optical links, thus providing OWC networking capability with a PCIe bus.

Embodiments can include a transmitter and/or receiver apparatus that includes a plurality of transmitters and receivers. Each transmitter and receiver can have the same or similar functionality as transmitter 24 and receiver 26 of the embodiment of FIG. 3. The transmitter apparatus in such embodiments can support a plurality of optical channels, for example with each transmitter and receiver using a respective different operating wavelength, or having a different channel a particular multiplexing scheme, and/or with each transmitter and receiver having a respective different (e.g. non-overlapping) direction of transmission and/or reception, for example different beam direction and spread and/or field of view.

The multiple optical channels can be used to support, multi-channel single link communication with the associated OWC device. Each device may for example be a device such as STA 30 with the same or similar components or functionality. Any other suitable devices that can support OWC communication may be used.

The interface control circuitry and the optical interface circuitry can operate so that, signals are sent between each data lane and corresponding one(s) of the optical channels. Thus, each data lane can provide data to or can receive data from a respective one or more of the optical channels, and high data rate point-to-point communication of data can be provided using the PCIe or other bus.

Such embodiments may also include a clock and data recovery module of the same or similar functionality as clock and data recovery module 54, which is operable to provide clock and/or control data for each of the data lanes and/or in respect of each of the optical channels as desired. At least some of the clock and/or control data may be common between different optical channels and/or data lanes.

Further embodiments are illustrated in FIGS. 5A and 5B.

The system of FIG. 5A shows an embodiment where multiple connection of OWC devices is also achieved by use of PCIe protocol device connection to the data bus using a data bus switch (such as for instance ASMedia 2824 24 lane, 12 port PCIe switch). Multiple OWC device users can connect to a data bus and associated bus network.via the bus device connections configured through the switch.

A processor 102 (for example a CPU, computer, server or other data source that provides the data is to be sent to devices) is connected to a data bus switching apparatus 104, in the form of a PCIe switch in this embodiment, via a root complex device 100.

Multiple PCIe device connections are made available directly or are available by way of the PCIe switching apparatus 104 and each PCIe device connection may be connected with an OWC interface apparatus 22, 32 and associated transmit and/or receiver apparatus to provide a free space OWC link connection with a further OWC mobile or stationary device 120a, 120b.

Data bus links shown in FIG. 5A may also for example comprise device connection points and comprise an OWC connection link comprising the OWC interface apparatus as described elsewhere in this disclosure.

Multiple users with multiple OWC devices can also be connected to a single data bus and associated bus network using the embodiment of FIG. 5A.

The OWC interface apparatus 22, 32 enables high data rate connection of the OWC transceiver to the digital bus The OWC interface apparatus 22, 32 as shown in FIG. 5A is as described in relation to FIG. 3.

The system of FIG. 5A also supports R.F.wireless communication using 5G module 122 using known techniques.

The system may operate to transmit or receive data bus data wirelessly over the 5G modem or other wireless connected devices such as a WiFi/RF device (not shown) in addition to or to supplement the data transferred over the optical wireless communication links.

In addition, the system supports OWC communication using known techniques based on use of WiFi/R.F. protocols by a WiFi/r.f. module 130, R.F. up-conversion and/or down/conversion and interfacing by module 132 and transmission of resulting OWC signals by further transceiver 134. This provides lower data rate communication than provided by the OWC interface apparatus 22, 32.

The processor 102 may control overall operation of the embodiment of FIG. 5A, for example selecting which of components 130, 22, 32, 122 are used for communication and/or directing different data streams to different devices. Alternatively a separate controller (not shown) may be provided or may be provided as part of one or more of components 130, 22, 32, 122.

FIG. 5B is a schematic illustration of an embodiment that is similar to that of FIG. 5A, but in which the PCIe switch can also provide a direct and/or wired connection to a further PCIe device 140, and in which a connection to a PCIe endpoint 142 can be provided via the root complex, without passing through the PCIe switch. A PCIe endpoint is, for example, a device with a type 00h configuration space header.

The system of FIG. 5B also includes an additional memory 144, for example a high level general purpose or dedicated memory used by a CPU, and a PCIe to PCIex bridge component 146, illustrating further devices that can be connected via the root complex 100

The embodiments of FIGS. 5A-5B support various modes of operation.

In a first mode of operation, the OWC interface apparatus 22, 32 initiates and maintains high data rate communication on digital bus OWC using transceivers 110a-110b. This allows multi-user access to high data rate transfer. In some cases, this may be simultaneously with independent operation of OWC transceiver 134 to transmit/receive data via the WiFi/r.f.-protocol based components 130, 132.

In a second mode of operation the OWC interface apparatus 22, 32 detects a reduced quality receiver signal, for example at 110a-110b. Based on signal levels e.g. RSSI or signal to noise ratio, BER, block error ratio, of one or more channels it is determined that the or an auxiliary Tx/Rx transceiver 134 should be operated for the OWC link with the reduced quality. This Tx/Rx 134 is connected to the optical I/F circuitry 132 and utilises the multi-user capability of the WiFi/RF module to provide lower data rate communication of transceiver 134 as determined by signal quality. When the signal quality improves—the communication reverts to the high data rate transceiver 110a-110b. This operation allows back up data rate OWC transmission on a specific link which may have reduced connectivity.

In an alternative mode of operation the reduction of signal quality may be detected by the OWC interface apparatus or the link connected OWC user device and an attempted OWC link connection may be re-established using at least one additional available data bus connected OWC interface apparatus and associated transmitter and/or receiver apparatus positioned at different locations. This may be particularly required for example where the user device is a moveable mobile device.

In a further alternative mode of operation the reduction of signal quality may be detected by the OWC interface apparatus or link-connected OWC user device and a wireless connection to the OWC user device may be established using other wireless means such as by way of an RF wireless link and associated bus connected RF modules or devices to supplement or support continuous data transfer. When the optical signal quality improves or supplementary or supporting data transfer is no longer required the data communication to the remote or user device may revert to the optical wireless communication link or vice versa to the other wireless means depending on which is the default wireless communication link In some embodiments, the interface control circuitry may be configured to inverse multiplex the data signals of a data lane and obtain and direct respective optical wireless communication signals to at least one optical channel and at least one further optical channel. The or an optical communication link to the or a remote device may comprise the at least one optical channel and the at least one further optical channel. The interface control circuitry may be configured to multiplex or combine optical wireless communication signals received from at least one optical channel and at least one further optical channel and provide or direct the multiplexed signals to the data lane.

The remote device may also be configured to multiplex or otherwise combine the received data signals from the optical channel and at least one further optical channel. The remote device may be configured to inverse multiplex data signals to be transmitted by the remote device, and optionally to transmit the multiplexed signals using the or an optical channel(s) and further optical channel(s).

More than one optical channel may, for example, be used for transfer of data to a remote device where the performance of the transmitter and receiver device(s) or the desired communication distance to the remote device are such that the bandwidth of an optical channel is limiting to the data signal transfer rate.

The encoding and/or modulation scheme of the at least one optical channel and the at least one further optical channel comprising the inverse multiplexed data signals may be the same as that used by the data bus protocol or may be converted into an alternative communication encoding and/or modulation scheme. For example orothogonal frequency division multiplexing (OFDM) may be used.

In some embodiments, a single PCIe lane or other data lane may be passed (e.g. inverse multiplexed) into multiple parallel of optical channels (e.g. inverse multiplex the PCIe signal) so each channel only transmits part signal (eg for 2.5 Gbps/4=0.625 Gbps). This means the data rate/bandwidth requirement for each transmitter and received pair is reduced and greater signal to noise ratio (e.g. poorer signal quality) or other below- or above-threshold value of measure of signal quality can be tolerated. The OWC signal can then, for example, be multiplexed following receipt via the optical channels at the remote device.

In a variant of or alternative to the embodiment of the preceding paragraph, the initial signal from the data lane(s) may additionally or alternatively be converted into different modulation scheme(s) before transmission via the optical channels, and then converted back into the original modulation scheme or other desired modulation scheme after receipt via the optical channels e.g. at the remote device. For example, there may be conversion between on-off keying (OOK) and OFDM modulation schemes, or between any other pairs or combinations of modulations schemes having lower and higher bandwidths respectively.

As discussed above in relation to certain embodiments, digital data buses can be used to drive the LAM. One such digital bus is the (PCIe) bus. However, embodiments are not limited to PCIe and other buses may be used, such as the Controller Area Network (CAN) bus, the Serial Peripheral Interface (SPI) bus, Thunderbolt, FireWire bus etc. All these buses are applied to wired connections using copper and also fibre. These buses can be used to drive a LAM. This can enable higher wireless transmission rates while leveraging basic physical layer and/or medium access control (MAC) layers that these wired busses can be based on.

By directly feeding the PCIe signal into the LAM, the effort and limitations of certain baseband designs can be bypassed, and higher data transfer rate can be supported. The LAM can be compact which makes it possible to be integrated into portable devices. High-speed near field communication (NFC) could be possible with multi Gbps data rate with an integrated LAM. Multi Gbps data rate may be obtainable and embodiments could be used in environments where R.F. could be dangerous or otherwise problematic. Improved heat management could also be obtained.

A skilled person will appreciate that variations of the described embodiments are possible without departing from the invention. Accordingly, the above description of specific embodiments is provided by way of example only and not for the purposes of limitation. It will be clear to the skilled person that modifications may be made to the embodiments without departing from the scope of the invention.

The invention claimed is:

1. An optical wireless communication (OWC) interface apparatus comprising:
   at least one of an input or output configured to transfer data signals at least one of from or to a bus device;
   optical interface circuitry configured to transfer OWC signals representative of the data signals between the OWC interface apparatus and at least one of a light transmitter apparatus or light receiver apparatus, wherein at least one of the light transmitter apparatus or light receiver apparatus is configured to at least one of transmit or receive the OWC signals as free space light signals; and
   interface control circuitry that is configured to at least one of establish or maintain communication with the bus device in accordance with a bus protocol thereby to enable transfer of the data signals between the OWC interface apparatus and the bus device,
   wherein the interface control circuitry is configured to control operation of at least one of the optical interface circuitry, the light transmitter apparatus or the receiver apparatus to at least one of establish or maintain optical wireless communication with a remote device using the free space light signals, and
   wherein the remote device comprises a mobile device and at least one of:
      the interface control circuitry is configured to monitor quality of communication with the remote device or to at least one of select or vary at least one operating parameter in order to maintain communication with the remote device; or
      the interface control circuitry is configured to select at least one operating parameter in dependence on at least one property of the remote device.

2. The OWC interface apparatus according to claim 1, wherein the interface control circuitry is configured to at least one of select or vary at least one operating parameter, in order to at least one of establish or maintain optical wireless communication with the remote device.

3. The OWC interface apparatus according to claim 1, including at least one of the light transmitter apparatus or the light receiver apparatus.

4. The OWC interface apparatus according to claim 3, wherein at least one of the light transmitter apparatus is configured to provide a single or a plurality of optical channels, and the interface control circuitry is configured to obtain optical wireless communication signals from the received data signals and to direct each optical wireless communication signal to a respective one or more of the optical channels; and the light receiver apparatus is configured to provide a single or plurality of optical channels, and the interface control circuitry is configured to obtain optical wireless communication signals via the optical channels and to direct a plurality of corresponding data signals to the bus device.

5. The OWC interface apparatus according to claim 4, wherein the data signals received from the bus device in accordance with the bus protocol are converted into at least one of an alternative encoding and modulation scheme for communication to the remote device over the optical channels.

6. The OWC interface apparatus according to claim 4, wherein the bus device comprises at least one device having at least one data lane, and the interface control circuitry is configured to at least one of: provide the data signals to the at least one data lane or obtain the data signals from the at least one data lane.

7. The OWC interface apparatus according to claim 6, wherein the optical interface circuitry is configured such that each data lane at least one of provides data to or receives data from a respective one or more of the optical channels.

8. The OWC interface apparatus according to claim 1, wherein the interface control circuitry is configured to provide a desired load when connected to the bus device, thereby to enable establishment and/or maintenance of communication with the bus device in accordance with the bus protocol.

9. The OWC interface apparatus according to claim 1, wherein the interface control circuitry is at least one of configured to send or receive signals at least one of to or from the bus device thereby to at least one of establish or maintain communication with the bus device in accordance with the bus protocol.

10. The OWC interface apparatus according to claim 1, wherein the interface control circuitry is configured to monitor for receipt of OWC signals by the light receiver apparatus and to establish communication with the bus device in response to receipt of an OWC signal.

11. The OWC interface apparatus according to claim 1, wherein the interface control circuitry is configured to control at least one of the amplitude or signal levels of "off" state, "on" state, signal characteristics of PAM, spatial modulation and other signal characteristics including signal identity by transmitter index identification of the free-space light signals at an operating wavelength or range of wavelengths, or any other operating parameter.

12. The OWC interface apparatus according to claim 1, wherein the bus device operates in accordance with a protocol that comprises at least one of a point-to-point protocol, a data bus protocol, a hardware device communication protocol, or a digital interconnect protocol.

13. The OWC interface apparatus according to claim 1, wherein the bus device operates in accordance with a standard or protocol that comprises at least one of a peripheral component interconnect express (PCIe) bus standard, a Controller Area Network (CAN), a Serial Peripheral Interface (SPI) bus standard, a Universal Serial Bus (USB) protocol, Thunderbolt bus, Firewire bus, or an Ethernet communication protocol.

14. The OWC interface apparatus according to claim 1, wherein at least one of:
  a) the OWC signals comprise LiFi signals;
  b) the OWC free space light signals comprise modulated visible, infra-red, ultraviolet or terahertz signals;
  c) the light transmitter apparatus or light receiver apparatus comprises at least one LED configured to convert OWC signals to corresponding free-space light signals;
  d) the light transmitter apparatus or light receiver apparatus comprises at least one photodetector to convert received free-space light signals to corresponding OWC signals; or
  e) the light transmitter apparatus or light receiver apparatus comprises at least one light antenna module (LAM).

15. An optical wireless (OWC) interface apparatus comprising:
  at least one of an input or output configured to transfer data signals at least one of from or to a bus device;
  optical interface circuitry configured to transfer OWC signals representative of the data signals between the OWC interface apparatus and at least one of a light transmitter apparatus or light receiver apparatus, wherein at least one of the light transmitter apparatus or light receiver apparatus is configured to at least one of transmit or receive the OWC signals as free space light signals; and
  interface control circuitry that is configured to at least one of establish or maintain communication with the bus device in accordance with a bus protocol thereby to enable transfer of the data signals between the OWC interface apparatus and the bus device,
  wherein the interface control circuitry is configured to monitor for receipt of OWC signals by the light receiver apparatus and, in response to receipt of an OWC signal, to at least one of:
  vary a load presented to the bus device;
  commence a wake-up procedure;
  send at least one of a wake-up signal, a handshake signal or a communication session request signal to the bus device.

16. The OWC interface apparatus according to claim 1, wherein the interface control circuitry is configured to at least one of process the data signals to obtain the optical wireless communication signals or process the optical wireless communication signals to obtain the data signals.

17. The OWC interface apparatus according to claim 1, wherein the bus protocol uses at least two signals to represent data and at least one of:
  a) the processing of the data signals comprises utilising the at least two signals to produce at least one corresponding OWC signal for providing to the light transmitter apparatus; or
  b) the processing of an OWC signal received by the light receiver apparatus comprises producing a corresponding signal for providing to conductors of a data lane.

18. The OWC interface apparatus according to claim 1, wherein the data in the data signals is encoded and/or modulated using on-off keying (OOK) encoding or pulse amplitude modulation (PAM) and corresponding data in the OWC signals is also encoded and/or modulated using on-off keying (OOK) or pulse amplitude modulation (PAM).

19. The OWC interface apparatus according to claim 1, wherein the bus protocol uses at least one of clock signals or control signals and at least one of:
- a) the interface control circuitry is configured to at least one of extract clock signals or control signals received from the bus and to include corresponding clock signals or control signals in the OWC signals; or
- b) the interface control circuitry is configured to determine at least one of clock data or control data from received OWC signals and to provide to the bus corresponding clock signals or control signals that are in accordance with the bus protocol.

20. The OWC interface apparatus according to claim 1, wherein the OWC signals include a representation of any layers of the bus communication protocol comprising at least one of data link or PHY layer data that is in accordance with the bus protocol.

21. The OWC interface apparatus according to claim 1, wherein at least one of:
- c) the interface control circuitry comprises at least one signal shaping component, configured to shape the OWC signals provided to the light transmitter apparatus;
- d) the interface control circuitry comprises at least one other signal shaping component configured to shape OWC signals received by the light receiver apparatus.

22. An optical wireless communication (OWC) interface apparatus comprising:
- at least one of an input or output configured to transfer data signals at least one of from or to a bus device;
- optical interface circuitry configured to transfer OWC signals representative of the data signals between the OWC interface apparatus and at least one of a light transmitter apparatus or light receiver apparatus, wherein at least one of the light transmitter apparatus or light receiver apparatus is configured to at least one of transmit or receive the OWC signals as free space light signals; and
- interface control circuitry that is configured to at least one of establish or maintain communication with the bus device in accordance with a bus protocol thereby to enable transfer of the data signals between the OWC interface apparatus and the bus device,
- wherein the interface control circuitry is configured to control or modify the signal amplitude and at least one of signal levels of "off" state, "on" state, signal characteristics of PAM, spatial modulation or other signal characteristics including amplitude of the free space light signals by controlling of a signal voltage of LED(s) or other transmission elements included in the light transmitter apparatus, or by controlling at least one amplifier that is configured to amplify the OWC signals provided to the light transmitter apparatus, and
- wherein the interface control circuitry is further configured to control at least one of the amplitude or signal levels of "off" state, "on" state, signal characteristics of PAM, spatial modulation and other signal characteristics including signal identity by transmitter index identification of the free-space light signals at an operating wavelength or range of wavelengths, or any other operating parameter.

23. An optical wireless communication (OWC) interface apparatus comprising:
- at least one of an input or output configured to transfer data signals at least one of from or to a bus device;
- optical interface circuitry configured to transfer OWC signals representative of the data signals between the OWC interface apparatus and at least one of a light transmitter apparatus or light receiver apparatus, wherein at least one of the light transmitter apparatus or light receiver apparatus is configured to at least one of transmit or receive the OWC signals as free space light signals; and
- interface control circuitry that is configured to at least one of establish or maintain communication with the bus device in accordance with a bus protocol thereby to enable transfer of the data signals between the OWC interface apparatus and the bus device,
- wherein the interface control circuitry is configured to switch between transmitting or receiving OWC signals from a transmit or receive channel of the at least one of a light transmitter apparatus or light receiver apparatus to a further transmit or receive channel of at least one of a light transmitter or light receiver apparatus based on signal quality including a reduction in signal quality of a received signal.

24. A system comprising at least a first optical wireless communication interface apparatus according to claim 1, operable to at least one of transmit or receive the free space light signals to or from a remote device via at least one optical channel, and a second interface apparatus configured to provide communication with the remote device or with a further device via at least one further optical channel provided by at least one of a further transmitter or receiver apparatus.

25. The system according to claim 24, wherein at least one of:
- a) the further interface circuitry uses at least one of WiFi or r.f. communication protocol to at least one of produce or process OWC signals representing the data; or
- b) the processor performs the switching in dependence on channel signal quality.

26. The system according to claim 24, wherein the at least one optical channel and the at least one further channel each provide communication with a respective different device, the different devices being at different locations.

27. A system comprising at least a first optical wireless communication interface apparatus comprising:
- at least one of an input or output configured to transfer data signals at least one of from or to a bus device;
- optical interface circuitry configured to transfer optical wireless communication (OWC) signals representative of the data signals between the OWC interface apparatus and at least one of a light transmitter apparatus or light receiver apparatus, wherein at least one of the light transmitter apparatus or light receiver apparatus is configured to at least one of transmit or receive the OWC signals as free space light signals;
- interface control circuitry that is configured to at least one of establish or maintain communication with the bus device in accordance with a bus protocol thereby to enable transfer of the data signals between the OWC interface apparatus and the bus device;
- at least the first optical wireless communication interface apparatus operable to at least one of transmit or receive the free space light signals to or from a remote device via at least one optical channel;
- a second interface apparatus configured to provide communication with the remote device or with a further device via at least one further optical channel provided by at least one of a further transmitter or receiver apparatus,
- wherein the second interface apparatus comprises further interface circuitry and associated further light transmitter apparatus configured to transmit OWC signals as free-space light signals; and
a processor configured to switch between transmitting data representative of the data signals using the light transmitter apparatus and the further light transmitter apparatus.

28. A system comprising at least a first optical wireless communication interface apparatus comprising:
at least one of an input or output configured to transfer data signals at least one of from or to a bus device:
optical interface circuitry configured to transfer optical wireless communication (OWC) signals representative of the data signals between the OWC interface apparatus and at least one of a light transmitter apparatus or light receiver apparatus, wherein at least one of the light transmitter apparatus or light receiver apparatus is configured to at least one of transmit or receive the OWC signals as free space light signals:
interface control circuitry that is configured to at least one of establish or maintain communication with the bus device in accordance with a bus protocol thereby to enable transfer of the data signals between the OWC interface apparatus and the bus device:
at least the first optical wireless communication interface apparatus operable to at least one of transmit or receive the free space light signals to or from a remote device via at least one optical channel;
a processor configured to switch between transmitting data representative of the data signals using the light transmitter apparatus and the further light transmitter apparatus;
a second interface apparatus configured to provide communication with the remote device or with a further device via at least one further optical channel provided by at least one of a further transmitter or receiver apparatus,
wherein the second interface apparatus comprises further interface circuitry and associated further light transmitter apparatus configured to transmit OWC signals as free-space light signals; and
wherein the second interface apparatus comprises an interface apparatus comprising:
at least one of a second input or second output configured to transfer data signals at least one of from or to a bus device;
second optical interface circuitry configured to transfer OWC signals representative of the data signals between the OWC interface apparatus and at least one of a light transmitter apparatus or light receiver apparatus, wherein at least one of the light transmitter apparatus or light receiver apparatus is configured to at least one of transmit or receive the OWC signals as free space light signals; and
second interface control circuitry that is configured to at least one of establish or maintain communication with the bus device in accordance with a bus protocol thereby to enable transfer of the data signals between the OWC interface apparatus and the bus device.

29. A method of providing optical wireless communication comprising:
transferring data signals at least one of from or to a bus device;
transferring optical wireless communication (OWC) signals representative of the data signals at least one of to or from at least one of a light transmitter apparatus or a light receiver apparatus;
at least one of transmitting or receiving the OWC signals as free-space light signals by the light transmitter or receiver device; and
establishing or maintaining communication with the bus device in accordance with a bus protocol thereby to enable transfer of the data signals between an OWC interface apparatus and the bus device;
controlling operation of at least one of optical interface circuitry, the light transmitter or the receiver apparatus to at least one of establish or maintain optical wireless communication with a remote device using the free space light signals; and
at least one of:
monitoring quality of communication with the remote device, or at least one of selecting or varying at least one operating parameter in order to maintain communication with the remote device; or
selecting at least one operating parameter in dependence on at least one Property of the remote device.

30. An optical wireless communication (OWC) interface apparatus comprising:
at least one of an input or output configured to transfer data signals at least one of from or to a bus device;
optical interface circuitry configured to transfer OWC signals representative of the data signals between the OWC interface apparatus and at least one of a light transmitter apparatus or light receiver apparatus, wherein at least one of the light transmitter apparatus or light receiver apparatus is configured to at least one of transmit or receive the OWC signals as free space light signals; and
interface control circuitry that is configured to at least one of establish or maintain communication with the bus device in accordance with a bus protocol thereby to enable transfer of the data signals between the OWC interface apparatus and the bus device;
at least one of the light transmitter apparatus or the light receiver apparatus,
wherein at least one of the light transmitter apparatus is configured to provide a single or a plurality of optical channels, and the interface control circuitry is configured to obtain optical wireless communication signals from the received data signals and to direct each optical wireless communication signal to a respective one or more of the optical channels; and
the light receiver apparatus is configured to provide a single or plurality of optical channels, and the interface control circuitry is configured to obtain optical wireless communication signals via the optical channels and to direct a plurality of corresponding data signals to the bus device,
wherein the bus device comprises at least one device having at least one data lane, and the interface control circuitry is configured to at least one of: provide the data signals to the at least one data lane or obtain the data signals from the at least one data lane,
wherein at least one of:
the interface control circuitry is configured to inverse multiplex the data signals from a data lane and direct the respective optical wireless communication signals to an optical channel and to at least one further optical channel; or the interface control circuitry is configured to multiplex or combine optical wireless communication signals received from an optical channel and at least one further optical channel and direct the multiplexed signals to a data lane.

* * * * *

UNITED STATES PATENT AND TRADEMARK OFFICE
CERTIFICATE OF CORRECTION

PATENT NO. : 12,489,526 B2
APPLICATION NO. : 17/928269
DATED : December 2, 2025
INVENTOR(S) : Harald Ulrich Haas et al.

Page 1 of 1

It is certified that error appears in the above-identified patent and that said Letters Patent is hereby corrected as shown below:

In the Claims

Column 26, Line 20, Claim 15, delete "An optical wireless (OWC)" and insert --An optical wireless communication (OWC)--

Signed and Sealed this
Thirtieth Day of December, 2025

John A. Squires
*Director of the United States Patent and Trademark Office*